(12) United States Patent
Nakatani et al.

(10) Patent No.: US 8,391,113 B2
(45) Date of Patent: Mar. 5, 2013

(54) OPTICAL DISC FOR TUPLE-SPEED RECORDING AND OPTICAL DISC DEVICE FOR TUPLE-SPEED RECORDING

(75) Inventors: Morio Nakatani, Ichinomiya (JP); Masato Fuma, Ichinomiya (JP); Kazuo Watabe, Minato-ku (JP); Yutaka Kashihara, Minato-ku (JP); Akihito Ogawa, Minato-ku (JP); Yutaka Yamanaka, Minato-ku (JP); Tatsunori Ide, Minato-ku (JP); Shuichi Ohkubo, Minato-ku (JP)

(73) Assignees: Sanyo Electric Co., Ltd., Osaka (JP); Toshiba Corporation, Tokyo (JP); NEC Corporation, Tokyo (JP)

( * ) Notice: Subject to any disclaimer, the term of this patent is extended or adjusted under 35 U.S.C. 154(b) by 474 days.

(21) Appl. No.: 12/371,443

(22) Filed: Feb. 13, 2009

(65) Prior Publication Data

US 2009/0207721 A1    Aug. 20, 2009

(30) Foreign Application Priority Data

Feb. 14, 2008   (JP) .................................. 2008-033825

(51) Int. Cl.
*G11B 19/28* (2006.01)

(52) U.S. Cl. ........................ 369/47.4; 369/94; 369/275.3

(58) Field of Classification Search ................... 369/47.4
See application file for complete search history.

(56) References Cited

U.S. PATENT DOCUMENTS

| | | | |
|---|---|---|---|
| 6,633,534 B1 | 10/2003 | Tosaki et al. | |
| 7,791,992 B2 * | 9/2010 | Shen et al. | 369/47.14 |
| 7,804,749 B2 * | 9/2010 | Lee et al. | 369/47.38 |
| 2002/0036959 A1 * | 3/2002 | Yen et al. | 369/47.4 |
| 2002/0131350 A1 * | 9/2002 | Kurobe et al. | 369/47.4 |
| 2004/0004921 A1 | 1/2004 | Lee et al. | |
| 2004/0095877 A1 | 5/2004 | Osakabe | |
| 2006/0050619 A1 | 3/2006 | Lee et al. | |

(Continued)

FOREIGN PATENT DOCUMENTS

| | | |
|---|---|---|
| CN | 1315037 A | 9/2001 |
| EP | 1102248 A1 | 5/2001 |

(Continued)

OTHER PUBLICATIONS

Chinese Office Action for corresponding CN Application No. 200910007429.2, dated Aug. 4, 2010, pp. 1-11 China.

(Continued)

*Primary Examiner* — Hoa T Nguyen
*Assistant Examiner* — Mark Fischer
(74) *Attorney, Agent, or Firm* — Ditthavong Mori & Steiner, P.C.

(57) ABSTRACT

An optical disc has a read-only system lead-in area and a recordable data area. Disc boundary information representing a boundary in a radial direction of an area on which capability of recording at a predetermined recording speed is guaranteed is recorded on the system lead-in area while being related to each tuple speed. An optical disc device, upon user's instruction of tuple-speed recording, compares the boundary information related to the instructed tuple speed with a present recording position, performs recording at the instructed tuple speed if the present recording position is on the outside of the boundary, and performs recording at a tuple speed lower than the instructed tuple speed if the present recording position is on the inside of the boundary.

5 Claims, 13 Drawing Sheets

U.S. PATENT DOCUMENTS

| | | | |
|---|---|---|---|
| 2006/0171278 A1* | 8/2006 | Matsumoto | 369/53.2 |
| 2006/0203662 A1 | 9/2006 | Lee et al. | |
| 2007/0121444 A1* | 5/2007 | Takeda et al. | 369/47.4 |
| 2007/0274178 A1* | 11/2007 | Kuroda | 369/47.4 |

FOREIGN PATENT DOCUMENTS

| | | | |
|---|---|---|---|
| JP | 2000-113458 A | 4/2000 | |
| JP | 2003-067935 A | 3/2003 | |
| JP | 2005-528720 A | 9/2005 | |
| JP | 2008-016159 A | 1/2008 | |
| WO | WO 2005/088611 A1 | 9/2005 | |

OTHER PUBLICATIONS

Notification of Reasons for Refusal, Japanese Patent Application No. 2008-033825; dated Oct. 25, 2011.

Office Action for related Japanese Patent Application No. 2008-033825 dated Aug. 21, 2012, pp. 1-11.

Chinese Office Action for CN Application No. 2009100074292, dated Jun. 25, 2010, pp. 1-6.

Chinese Office Action for CN Application No. 2009100074292, dated Jun. 25, 2012, pp. 1-6.

* cited by examiner

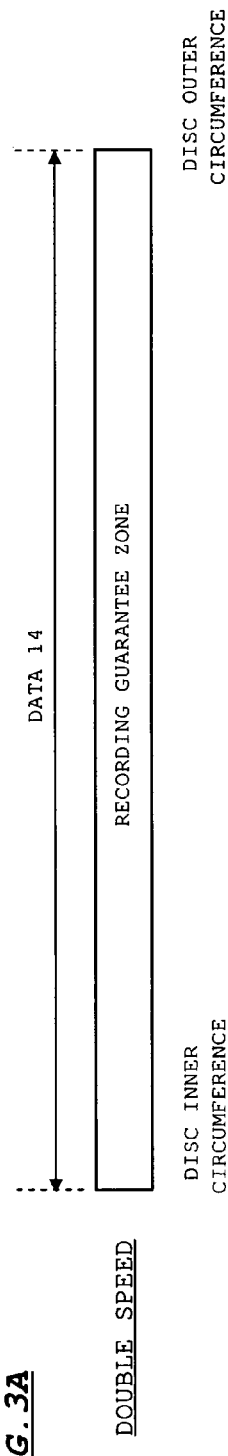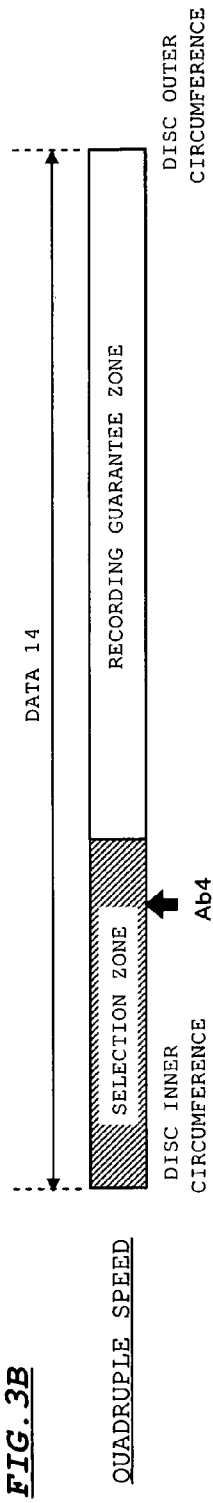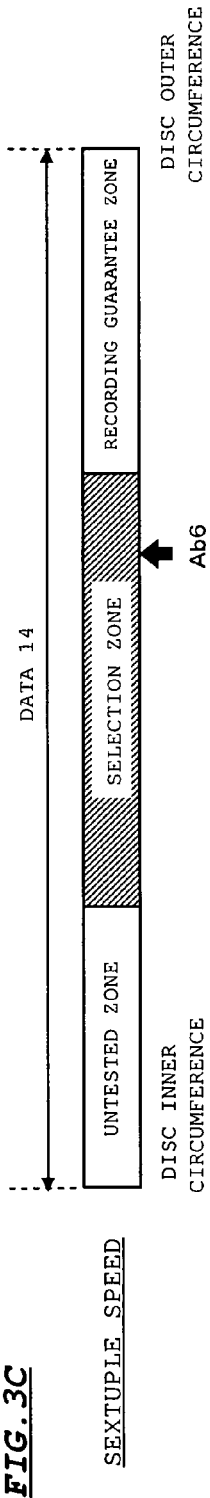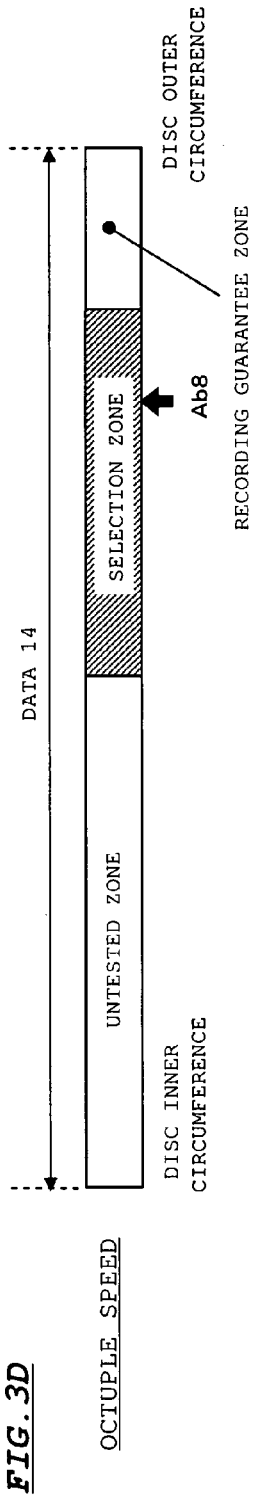
FIG. 3A DOUBLE SPEED
FIG. 3B QUADRUPLE SPEED
FIG. 3C SEXTUPLE SPEED
FIG. 3D OCTUPLE SPEED

DOUBLE SPEED

QUADRUPLE SPEED

SEXTUPLE SPEED

OCTUPLE SPEED

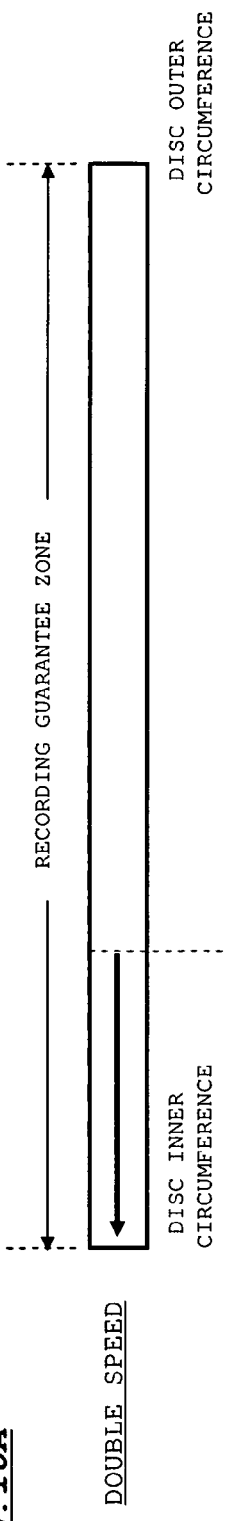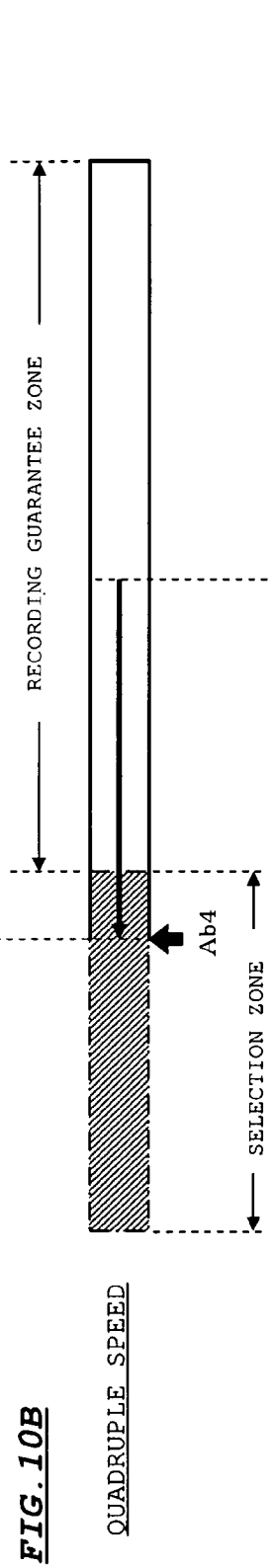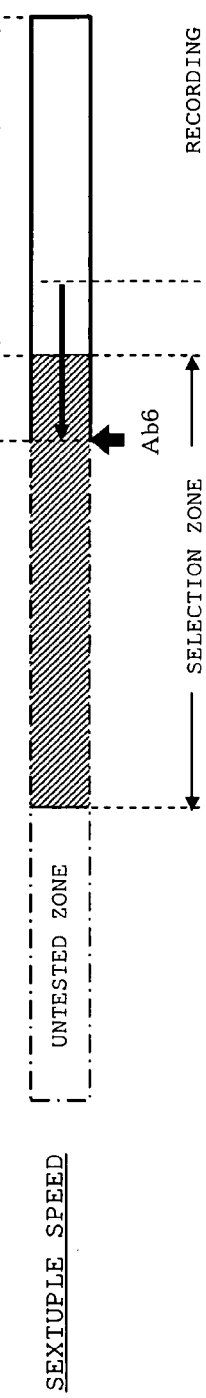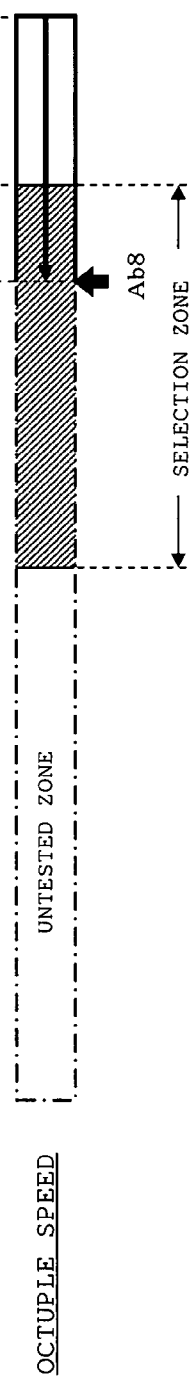
FIG. 10A DOUBLE SPEED
FIG. 10B QUADRUPLE SPEED
FIG. 10C SEXTUPLE SPEED
FIG. 10D OCTUPLE SPEED

OPTICAL DISC FOR TUPLE-SPEED RECORDING AND OPTICAL DISC DEVICE FOR TUPLE-SPEED RECORDING This application claims priority under 35 U.S.C. Section 119 of Japanese Patent Application No. 2008-33825 filed Feb. 14, 2008, entitled "OPTICAL DISC AND OPTICAL DISC DEVICE".

BACKGROUND OF THE INVENTION

1. Field of the Invention

The present invention relates to a recordable (including write-once and rewritable) optical disc and an optical disc device for recording thereon, and more specifically to the same suitable for recording at a so-called tuple speed higher than a normal recording speed.

2. Description of the Related Art

Conventional recordable optical discs are often used for recording at a tuple speed higher than a normal recording speed. Double or treble-speed recording advantageously reduces recording time and improves user-friendliness. Resulting recent demand for higher-speed recording has already caused octuple or more-speed drives commercialized.

However, due to its threshold strength, an optical disc may suffer from fracture in its polycarbonate substrate under overly high-speed rotation during tuple-speed recording. In particular, an HD DVD (High-Definition Digital Versatile Disc; hereinafter referred to as "HD"), which is one of the next-generation DVDs, rotates at a linear velocity of 6.61 m/sec even during normal-speed recording, and therefore, undergoes considerably high disc rotational speed (rpm; hereinafter the same shall apply) during tuple-speed recording. More specifically, disc recording on inner areas causes higher disc rotational speeds, and therefore, even quadruple-speed recording will cause rotational speeds higher than 10,000 rpm on an inner area bounded by a certain radius. It should be noted that the rotational speed of 10,000 rpm, at present, gives a guide as to whether to consider the threshold strength of an optical disc.

Therefore, the HD recording at a quadruple or more speed requires recording on an inner area at an over-threshold rotational speed. However, recording at such a high rotational speed does not necessarily bring proper characteristics to the recorded signals, but may cause insufficient reliability of the recorded information. In addition, although disc manufacturers usually conduct a test to guarantee reliability of their discs, a proper test can hardly be conducted at such a high rotational speed over 10,000 rpm because of characteristics of an inspection device, disc strength and others. Therefore, disc manufacturers supposedly conduct a test for recording characteristics only in a middle and/or outer circumferential area which allows low rotational speeds. Even if extending the test to the inside of that area, the manufacturers may only do in an area which allows rotational speeds lower than 10,000 rpm to enable the test.

In the aforementioned case, in light of user-friendliness, tuple-speed recording is preferably conducted on as wide an area as possible, whereas the tuple-speed recording even in an inner area, which does not guarantee recording characteristics, will reduce reliability of the recorded information and may cause important information to be lost.

The range of the inner circumferential area of the disc that guarantees the signal characteristics of tuple-speed recording, as described above, strongly depends on testing methods and performance of testing devices of disc manufacturers, and therefore, depends on the manufacturers and their discs. Thus, tuple-speed recording in accordance with a range uniformly set by a disc drive as recordable at a tuple speed may be performed, for some discs, even on an area where recording characteristics under an instructed tuple-speed are not guaranteed, thereby impairing reliability of recorded information, but not performed, for other discs, even on an area recordable at the tuple speed, therefore detracting user-friendliness.

SUMMARY OF THE INVENTION

It is an object of the present invention to realize both improvement in user-friendliness and reliability of recorded information by performing tuple-speed recording on a proper area of the disc.

A first aspect of the present invention is directed to a recordable optical disc. The optical disc according to the present aspect of the invention includes a read-only system area and a recordable data area. Boundary information representing a boundary in a radial direction of an area on which capability of recording at a predetermined recording speed is guaranteed is recorded on the system area. System lead-in area 13 in the following preferred embodiments corresponds to the system area on the disc of the present aspect of the invention.

In accordance with the optical disc of the present aspect of the invention, an optical disc device can specify the boundary of the recording speed in the radial direction of the disc by reproducing the system area. Therefore, the optical disc device can, when a high-speed recording (tuple-speed recording) is instructed during recording, control a recording speed properly to perform the high-speed recording (tuple-speed recording) on an area capable of being recorded on at the instructed high speed (tuple speed), and to perform recording on other areas at a lower speed than the instructed speed (tuple speed). This control realizes both improvement in user-friendliness and reliability of the recorded information by high-speed (tuple-speed) recording.

In the optical disc according to the first aspect of the invention, the data area can be divided in the radial direction into a recording guarantee zone that requires unfailing capability of recording thereon at the predetermined recording speed, and a selection zone on which a disc manufacturer can, if desired, determine a radial position up to which capability of recording at the predetermined recording speed is guaranteed for each disc. In this configuration, if the boundary has to be set within the selection zone, an optical disc device can perform such a control as to avoid high-speed (tuple-speed) recording or recording itself on an optical disc on which the boundary is set on the outside of the selection zone, by determining that the disc is doubtful in reliability.

In the case of the optical disc according to the first aspect of the invention including a plurality of recording layers provided in the thickness direction of the disc, the boundary information can be recorded on the system area for each of the plurality of recording layers while being related to the speed information. In this configuration, with respect to the boundary set for one recording layer of the plurality of recording layers closest to a light irradiation side, the boundary set for an other recording layer of the plurality of recording layers is preferably shifted in the radial direction of the disc. Here, the amount of the shift on the other recording layer is given, taking into account the estimated decentering of the optical disc and a possible mounting error of the optical disc with respect to a turntable, for example. Such a shift of the boundary on the other recording layer in the radial direction of the disc can improve the reliability of the boundary on the other recording layer, and thereby improve the reliability of the recording information.

A second aspect of the present invention is directed to an optical disc device for recording information on a recordable optical disc. The optical disc according to the present aspect of the invention includes an optical pickup that irradiates the optical disc with laser light, a disc drive unit that rotationally drives the disc, a servo unit that controls the optical pickup and the disc drive unit, an information recording unit that records information on the disc through the optical pickup at a predetermined speed and is capable of changing a recording speed of the information if desired, and an information reproduction unit that reproduces information from the disc through the optical pickup. Here, the optical disc includes a read-only system area and a recordable data area. Further, disc boundary information representing a boundary in a radial direction of an area on which capability of recording at a predetermined recording speed is guaranteed is recorded on the system area while being related to speed information on the recording speed. The information recording unit, upon an instruction of recording at a first recording speed, compares the boundary related to the first recording speed with a present recording position, performs recording at the first recording speed if the present recording position is on an outside of the boundary, and performs recording at a second recording speed lower than the first recording speed if the present recording position is on an inside of the boundary.

In accordance with the optical disc device of the second aspect of the invention, when a high-speed recording (tuple-speed recording) is instructed during recording, the high-speed recording (tuple-speed recording) is performed on an area capable of being recorded on at the instructed high speed (tuple speed), and recording is performed on other areas at a lower speed than the instructed speed (tuple speed). This recording realizes both improvement in user-friendliness and reliability of the recorded information by high-speed (tuple-speed) recording.

In the optical disc device according to the second aspect of the invention, the information recording unit can be configured to hold drive boundary information that represents a boundary in a radial direction of an area set as being capable of being recorded on at a predetermined recording speed, while relating the drive boundary information to the speed information on the recording speed. In this configuration, the information recording unit, upon an instruction of recording at a first recording speed, performs recording at a third recording speed lower than the first recording speed, if the present recording position is on an inside of the boundary of the first recording speed based on the drive boundary information even if the present recording position is not on an inside of the boundary of the first recording speed based on the disc boundary information. It should be noted that the third recording speed can be the same as the second recording speed, and can also be different from the second recording speed.

A third aspect of the present invention is directed to a recordable optical disc. The optical disc according to the present aspect of the invention includes a read-only system area and a recordable data area. The data area includes a recording guarantee zone that requires capability of recording thereon at a predetermined speed, wherein the recording guarantee zone is provided on a partial area formed by dividing the data area in a radial direction.

In accordance with the optical disc of the present aspect of the invention, since a recording guarantee zone that requires capability of being recorded on at a predetermined recording speed is set beforehand on the data area, an optical disc device can specify an area on which recording at the related recording speed (tuple-speed) can be performed. Therefore, the optical disc device can, when a high-speed recording (tuple-speed recording) is instructed during recording, control a recording speed properly to perform the high-speed recording (tuple-speed recording) on the recording guarantee zone, and to perform recording on the inside thereof at a lower speed than the instructed speed (tuple speed). This control realizes both improvement in user-friendliness and reliability of the recorded information by high-speed (tuple-speed) recording.

In the optical disc according to the third aspect of the invention, the data area can be divided in a radial direction into the recording guarantee zone that requires capability of recording thereon at a predetermined speed and a selection zone on which recording operation at the predetermined recording speed can be performed properly depending on a servo characteristic.

A fourth aspect of the present invention is directed to an optical disc device for recording information on a recordable optical disc. The optical disc device according to the present aspect of the invention includes an optical pickup that irradiates the optical disc with laser light, a disc drive unit that rotationally drives the disc, a servo unit that controls the optical pickup and the disc drive unit, and an information recording unit that records information on the disc through the optical pickup at a predetermined speed and is capable of changing a recording speed of the information if desired. The information recording unit specifies a boundary of an area that can be recorded on at a first recording speed based on a servo characteristic of the optical pickup while driving the disc at the first recording speed, performs recording at the first recording speed if the present recording position is on an outside of the boundary, and performs recording at a second recording speed lower than the first recording speed if the present recording position is on an inside of the boundary.

In accordance with the optical disc device of the present aspect of the invention, a boundary between an area for the first recording speed and an area for the second recording speed can be set based on a servo characteristic if desired even in the case that the data area is not divided into the recording guarantee zone and the selection zone beforehand. Therefore, the optical disc device according to the present aspect of the invention can perform the recording operation smoothly and effectively at the first and second recording speeds.

BRIEF DESCRIPTION OF THE DRAWINGS

These and other objects and novel features of the present invention will become more apparent from the following description of the preferred embodiments of the present invention when taken in conjunction with the accompanying drawings.

FIGS. 3A to 3D show exemplary setting of disc boundary information according to the preferred embodiment of the present invention.

FIG. 10A to 10D are diagrams schematically showing tuple-speed recording operation according to another preferred embodiment 1 of the present invention.

The drawings are for illustrative purposes only and not restrictive on the scope of the claimed invention.

DESCRIPTION OF PREFERRED EMBODIMENTS

Hereinafter, preferred embodiments of the present invention will be described with reference to the accompanying drawings. The embodiments are applications of the present invention to recordable HDs.

Figure 1:
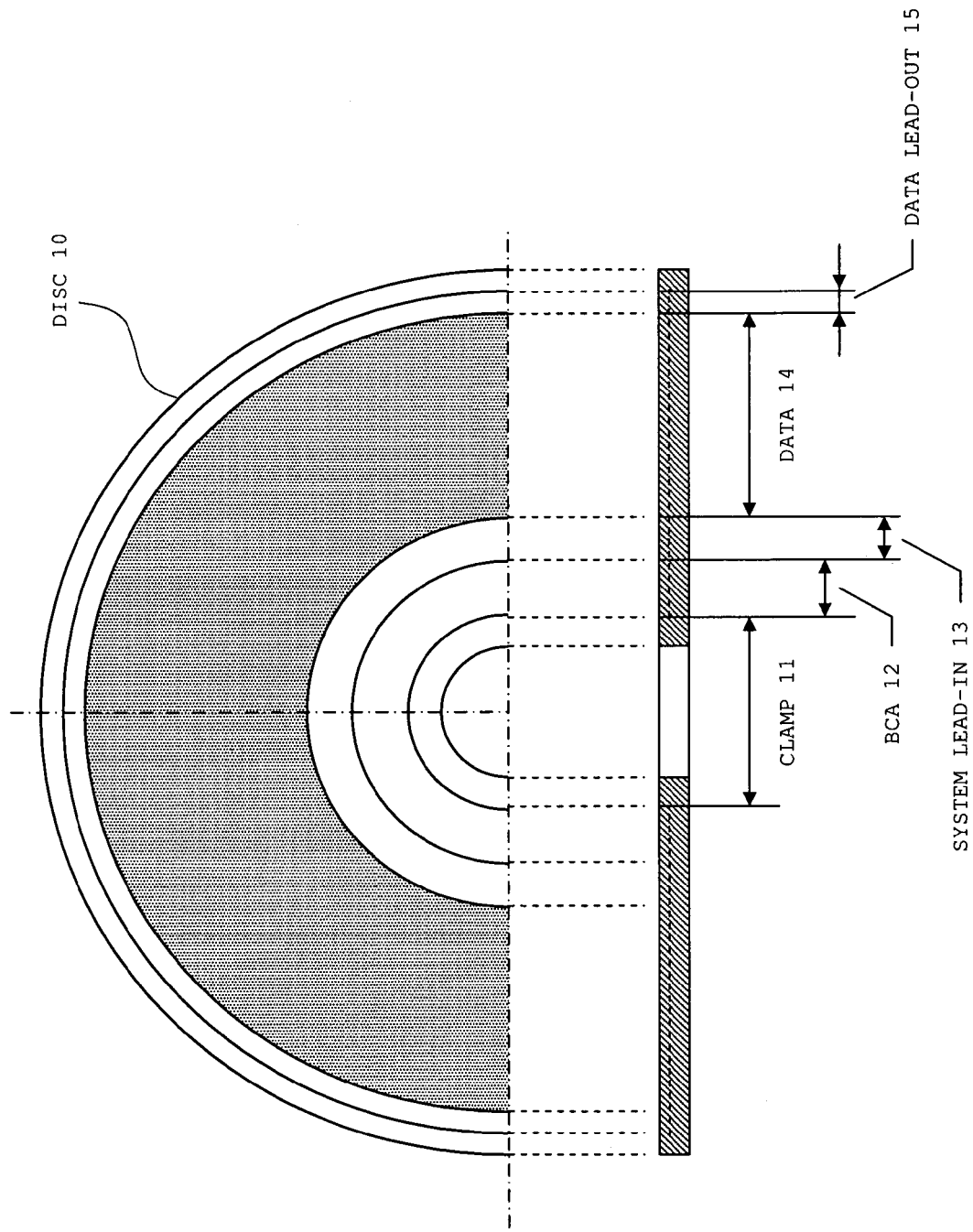
FIG. 1 shows an area format of a disc according to a preferred embodiment of the present invention.

FIG. 1 shows an area format of disc 10.

Disc 10 is divided into areas which are, starting from the innermost circumference, clamp area 11, burst cutting area (BCA) 12, system lead-in area 13, data area 14, and data lead-out area 15.

On BCA 12, predetermined information is recorded in accordance with the HD standard. Specifically, information including a BCA_ID and the book number of a written standard on which the disc relies is recorded by intermittently removing a flat recording layer in the circumferential direction of the disc. On BCA 12, the type of the disc is further recorded, based on which the disc type is identified together with the book number. The recording layer is removed by being burned off with high power laser. The BCA information includes information for disc identification, but does not include information on the tuplicity number of a recordable speed.

Positioning a beam spot on BCA 12 causes reflected light bright and dark depending on the removed and the unremoved portions of the recording layer. By demodulating change in the brightness of the reflected light, the information recorded on BCA 12 is reproduced.

On system lead-in area 13, information on the physical parameters of the disc (e.g., pit size and track pitch) is recorded by arranging a train of pits in a spiral on the recording layer. The details of the information recorded on system lead-in area 13 will be explained below with reference to FIG. 3. It should be noted that, on system lead-in area 13, the train of pits are formed without a groove formed.

On data area 14, a groove is formed in a spiral. Various data are recorded on this groove. The groove is wobbled in a radial direction. The wobble holds physical addresses. Specifically, phase modulation sections holding the physical addresses are placed within a uniform wobble section at a constant period. When a beam scans such phase modulation sections, change in the intensity of the reflected light allows the physical addresses on the groove to be read out and reproduced. The data recording is performed from the inner to outer circumferences of the disc.

On data lead-out area 15 as well as data area 14, a spiral groove is formed. This groove is also wobbled in the radial direction of the disc as well as the groove on data area 14. On data lead-out area 15, zones are defined in accordance with the HD standard, whereas user data is not recorded.

On system lead-in area 13, a large track pitch is provided to facilitate readout of initial physical information or the like of the disc. The physical parameters used in the present preferred embodiment are shown in the following table.

|  | SYSTEM LEAD-IN AREA | DATA AREA DATA LEAD-OUT AREA |
| --- | --- | --- |
| DATA BIT LENGTH | 0.306 um | 0.153 um |
| CHANNEL BIT LENGTH | 0.204 um | 0.102 um |
| MINIMUM PIT LENGTH (2T) | 0.408 um | 0.204 um |
| MAXIMUM PIT LENGTH (13T) | 2.652 um | 1.326 um |
| TRACK PITCH | 0.68 um | 0.4 um |

Figure 2:
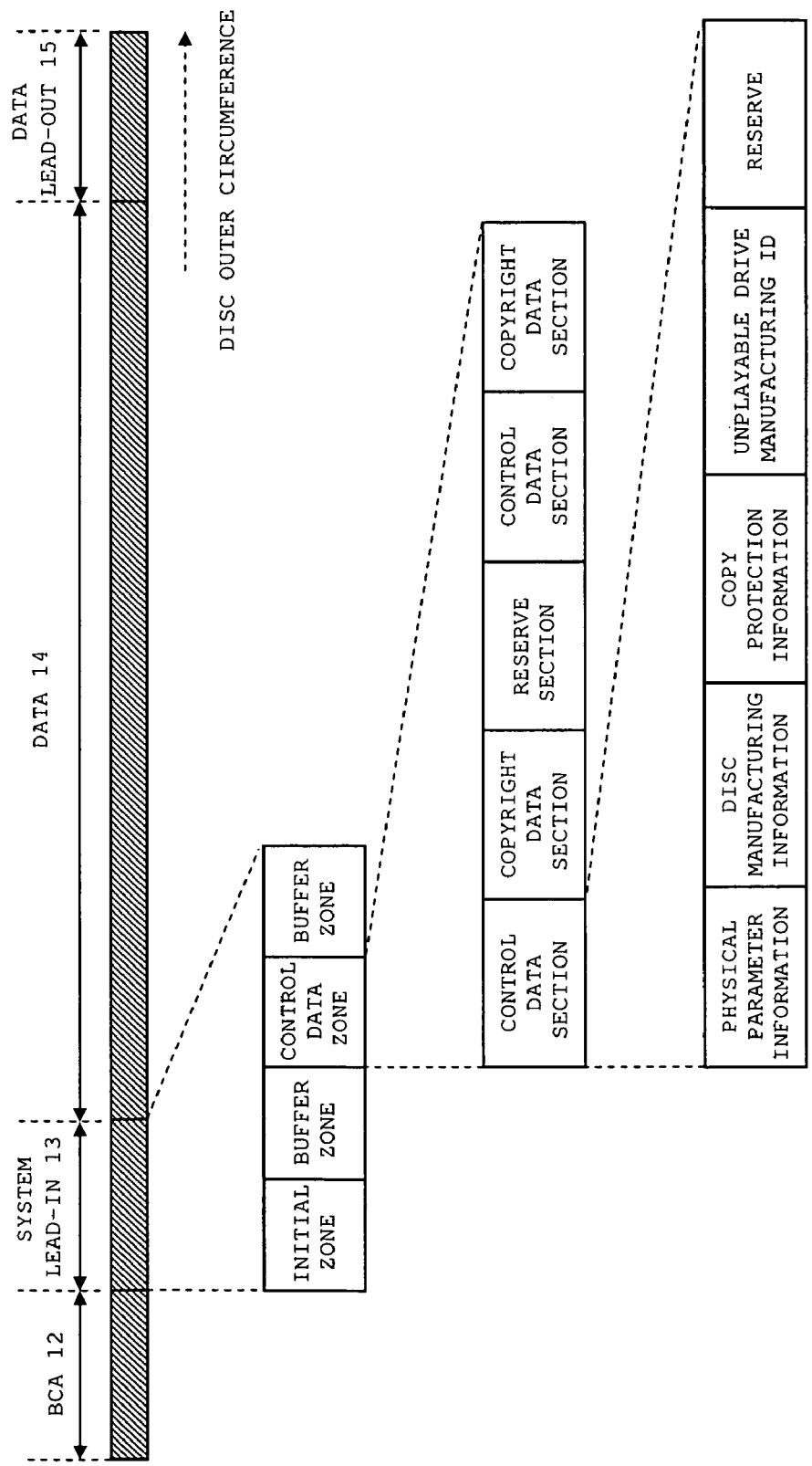
FIG. 2 shows a data format on a system lead-in area according to the preferred embodiment of the present invention.

FIG. 2 shows a data format of system lead-in area 13.

As shown in FIG. 2, the initial physical information on system lead-in area 13 is divided into an initial zone, a buffer zone, a control data zone, and a buffer zone. Data like physical parameters are held on the control zone. Specifically, the control zone is further divided into a control data section, a copyright data section, a reserve section, a control data section, and a copyright data section. The two control data sections hold the same data. The two copyright data sections also hold the same information.

Among those sections, the control data section holds physical parameter information including the book version information of the written standard, recording power information and record starting position information. The control data section holds disc manufacturing information for identifying a disc manufacturer, copy protection information, and an unplayable drive manufacturing ID, and is provided with a reserve area.

In the present embodiment, in addition to recording parameters for predetermined tuple speeds, as one of physical parameter information, boundary information (physical addresses) representing boundaries of areas on which capability of recording at predetermined tuple speeds is guaranteed is held on the control data section while being related to corresponding tuple-speed information. Since conventional physical parameter information has free space, information relating the boundary information (physical addresses) with tuple-speed information (hereinafter referred to as "disc boundary information") is included in the physical parameter information by use of the free space. For example, 4-byte boundary information (physical address) is assigned to each of recording speeds supported by disc 10. The physical address of the innermost circumference on which capability of recording at each of the recording speeds is guaranteed is assigned to the 4-byte information. However, for a recording speed that can guarantee recording throughout the disc 10, a physical address absent on whole disc 10, such as "physical address=00000000h," can be assigned.

In the present embodiment, since the BCA information does not include the tuple-speed information, it is not certain without reproducing the system lead-in information whether disc 10 is tuple-speed recording medium or not. Particularly in a recordable disc, the recording parameters and the tuple-speed information are preferably read out prior to recording. The physical parameter information is read out by a drive (optical disc device) from disc 10. Thus, included in the physical parameter information, the disc boundary information is ensured to be obtained by the drive.

Although the disc boundary information can also be held on the reserve area in the control data section, the reserve area is not necessarily read out depending on the drive, and therefore the disc boundary information is, in some cases, not read out smoothly by the drive. For this reason, the disc boundary information is preferably included in the physical parameter information, which is read out by the drive.

In addition, the disc boundary information may be held on BCA 12. The disc boundary information can thereby be obtained instantly at the time of disc determination, and the corresponding tuple-speed information can be obtained. In this case, detailed data, such as the recording parameters and servo parameters for each corresponding tuple-speed are preferably recorded on the BCA information so that these data can also be obtained. However, if all the information cannot be recorded due to data capacity, the disc boundary information is preferably included in the system lead-in information as described above. In this configuration, drive operation for reading out the disc boundary information will advantageously not be complicated. Further, if the disc boundary information is recorded at a position within a free space of an area where usual readout is performed, the drive can handle the disc without significantly changing its operation, thereby reducing its development costs.

Now, exemplary setting of the disc boundary information will be described with reference to FIGS. 3A to 3D. FIGS. 3A, 3B, 3C, and 3D show examples of setting of the disc boundary information for double, quadruple, sextuple, and octuple recording speeds, respectively.

In the present embodiment, tuple-speed recording is supposed to be double, quadruple, sextuple, and octuple ones. Data area 14 is divided into a recording guarantee zone, a selection zone, and an untested zone in a radial direction for each tuple-speed in advance. For the recording guarantee zone, unfailing capability of recording at a corresponding tuple speed is guaranteed. For the selection zone, the disc manufacturer can, if desired, determine thereon a radial position up to which capability of recording at a corresponding tuple speed is guaranteed for each disc. The untested zone is determined by the disc manufacturer in advance as a zone which cannot be tested by their usual method at a corresponding tuple-speed because of possibility of disc fracture due to rotation at the corresponding tuple-speed for example.

The disc manufacturer determines up to what a radial position recording at a corresponding tuple-speed is guaranteed for each selection zone. The disc manufacturer performs this determination by conducting a test for their disc 10 by their own evaluation method. Their determined boundary position (physical address) and its tuple-speed information are recorded as the disc information on system lead-in area 13 as described above. FIGS. 3A to 3D show the boundary positions (physical addresses) for respective tuple-speeds with symbols Ab4, Ab6, and Ab8.

In the exemplary setting shown in FIGS. 3A to 3D, whole data area 14 is set as recording guarantee zone for a double speed. Therefore, there is not the above-described boundary position for the double-speed. In this case, the disc boundary information for the double-speed shows that capability of recording is guaranteed for whole data area 14.

Figure 4:
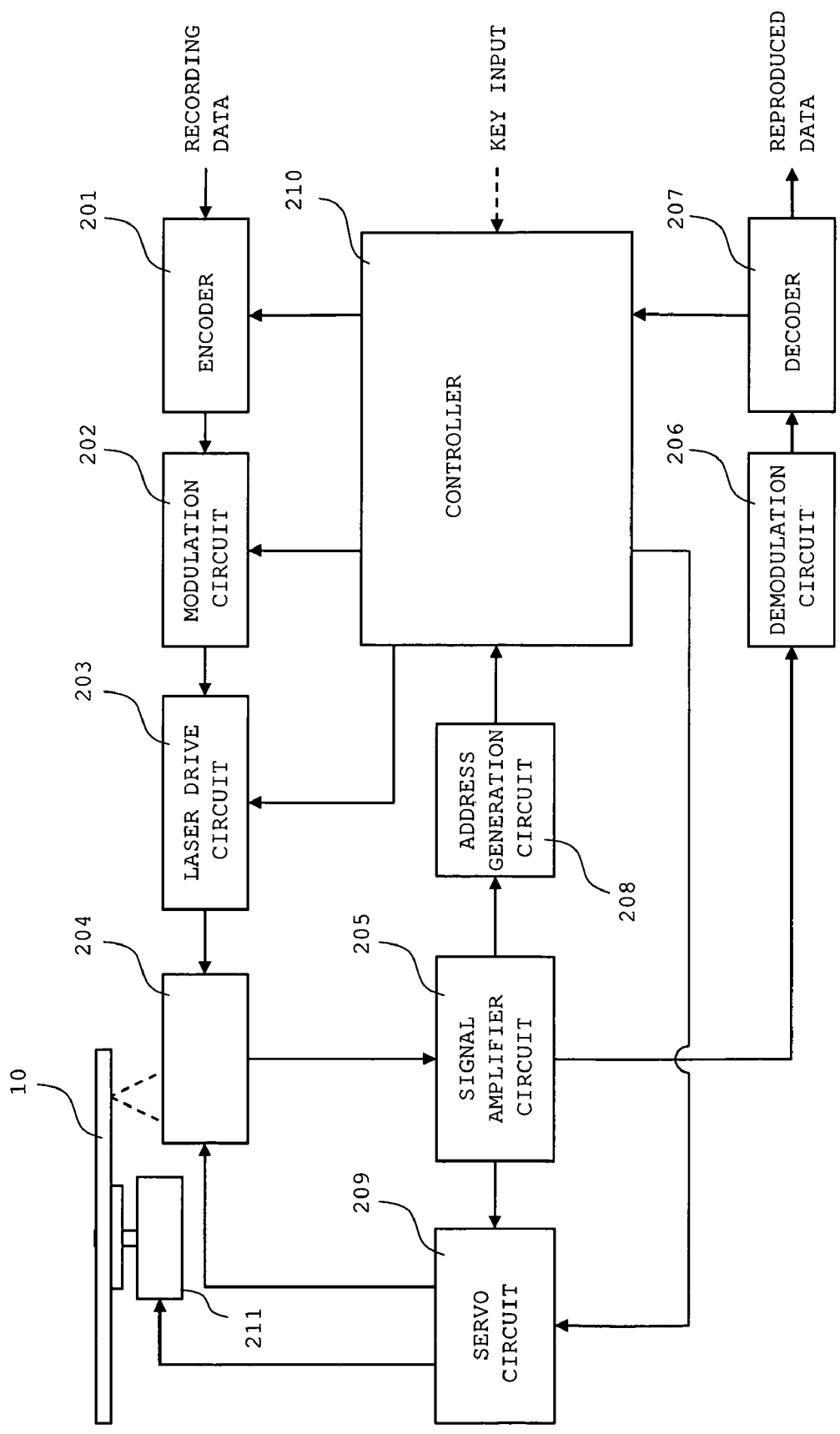
FIG. 4 shows a structure of an optical disc device according to the preferred embodiment of the present invention.

FIG. 4 shows a configuration of an optical disc device for recording on and reproduction from disc 10.

As shown in FIG. 4, the optical disc device includes encoder 201, modulation circuit 202, laser drive circuit 203, optical pickup device 204, signal amplifier circuit 205, demodulation circuit 206, decoder 207, address generation circuit 208, servo circuit 209, controller 210, and disc drive motor 211.

Encoder 201 applies encoding process, such as addition of error correcting codes, to input recording data, and then outputs the processed data to modulation circuit 202. Modulation circuit 202 applies predetermined modulation to the input recording data, generates recording signals, and outputs the signals to laser drive circuit 203.

Laser drive circuit 203, during recording, supplies drive signals depending on the recording signals from modulation circuit 202 to a semiconductor laser in optical pickup device 204; and, during reproduction, supplies drive signals to the semiconductor laser in optical pickup device 204 to cause the laser to emit laser light at a constant power. Here, the laser power during the recording and the reproduction is controlled by controller 210. Controller 210, during the recording, performs trial writing on trial-writing area to set the laser light at an optimum power.

Optical pickup device 204 includes the semiconductor laser for emitting laser light of 405 nm wavelength and a light detector for receiving reflected light from disc 10. Device 204 further includes an objective lens actuator for adjusting irradiation of the laser light on a track, an optical system for leading the laser light emitted from the semiconductor laser to the objective lens and leading the reflected light from disc 10 to the light detector, and the like.

Signal amplifier circuit 205 amplifies and arithmetically processes the output signals from the light detector arranged in optical pickup device 204, thereby generates a reproduction RF signal, a focus error signal, a tracking error signal, a wobble signal and the like, and supplies these signals to corresponding circuits. Signal amplifier circuit 205 subtracts and amplifies signals coming from a pair of optical sensors for detecting distribution of reflected light intensity in radial direction (radial direction of a disc), and thereby generates a radial push-pull signal (RPP signal). The circuit 205 further extracts a low frequency component from the RPP signal to generate the tracking error signal, and extracts a high frequency component from the RPP signal to generate the wobble signal. The wobble signal reflects the wobbled form of the groove formed on disc 10.

Demodulation circuit 206 demodulates the reproduction RF signal input from signal amplifier circuit 205, thereby generates reproduced data, and outputs the data to decoder 207. Decoder 207 applies decoding process, such as error correction, to the data input from demodulation circuit 206, and outputs the processed data to the subsequent circuit. Decoder 207 outputs management information, such as reproduced BCA information and system lead-in information, to controller 210. Controller 210 stores the management information in a built-in memory.

Address generation circuit 208 reproduces address information from the wobble signal input from signal amplifier circuit 205, and outputs the information to controller 210.

Servo circuit 209 generates a focus servo signal and a tracking servo signal from the focus error signal and the tracking error signal input from signal amplifier circuit 205, and outputs these signals to the objective lens actuator in optical pickup device 204. Servo circuit 209 further generates a motor servo signal from the wobble signal input from signal amplifier circuit 205, and outputs the signal to disc drive motor 211. Servo circuit 209 drives disc 10 so as to keep a linear velocity constant during recording at normal and tuple speeds.

Controller 210, including a CPU (Central Processing Unit) and a memory, stores various data in the memory, and controls each component in accordance with a control program stored in the memory beforehand. It should be noted that controller 210 holds boundary information (hereinafter, referred to as "drive boundary information") that shows a radial position (physical address) to which from the outer circumference controller 210 itself can perform recording at a tuple speed while relating the information to the corresponding tuple-speed. This drive boundary information is set uniquely by a drive manufacturer based on the performance of the optical disc device.

Figure 5:
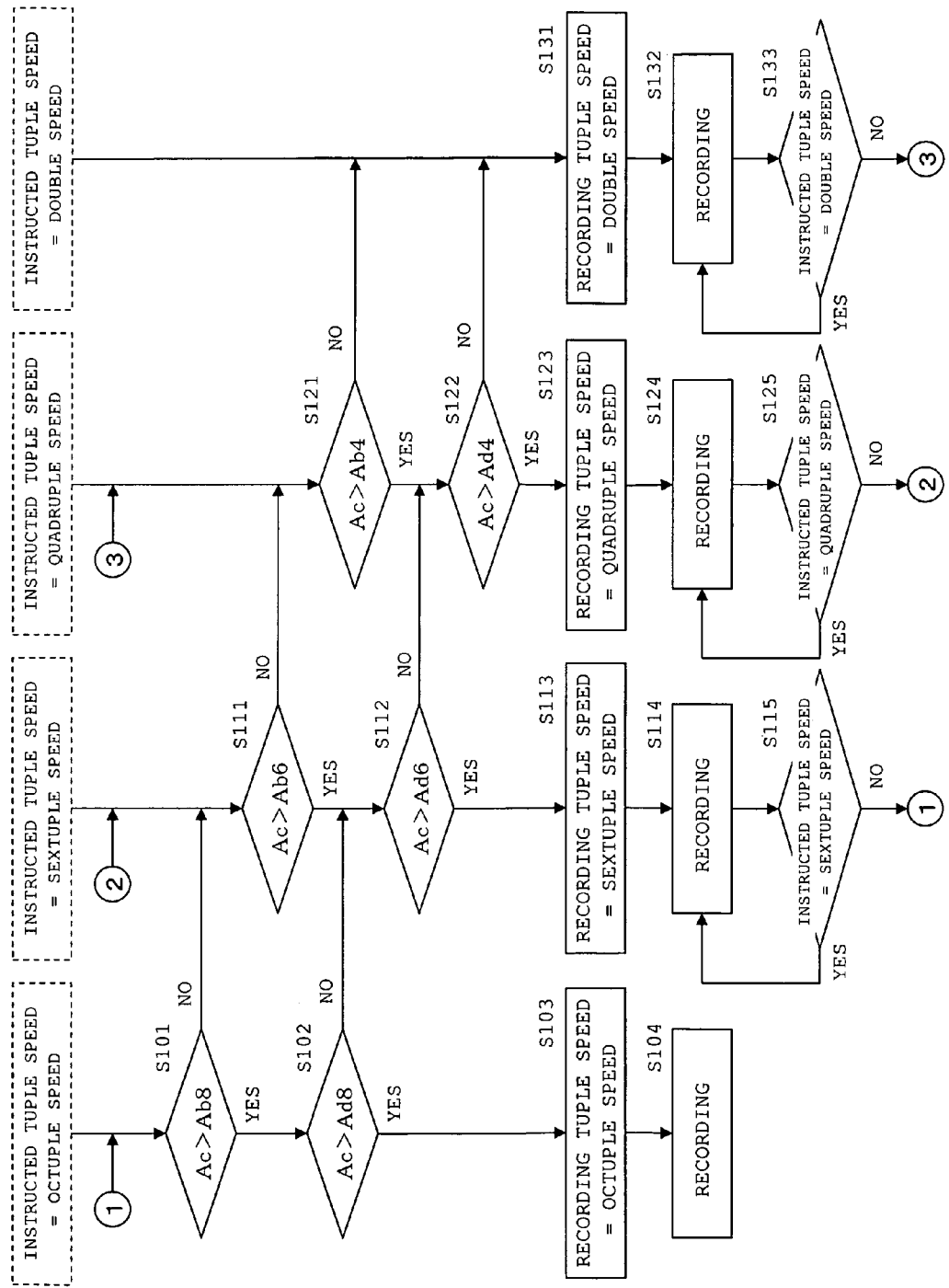
FIG. 5 is a process flow chart in tuple-speed recording according to the preferred embodiment of the present invention.

FIG. 5 shows a process flow chart for tuple-speed recording. In this flow chart, disc 10 is supposed to be a disc of a write-once format (HDDVD-R).

Once disc 10 is mounted in the optical device, the system lead-in information is read out and stored in a memory in controller 210. The system lead-in information is, in some cases, directly read out from system lead-in area 13 shown in FIG. 2, and in other cases, obtained by reading out the system lead-in information copied in a data lead-in in data area 14. After this initial operation, recording is started in response to user's instruction.

When the mounted disc is a blank one, the system lead-in information is read out, a data lead-in area is formed in data area 14, the system lead-in information is copied on the formed data lead-in area, and the drive test area and the like are provided. A linear velocity during recording on the data lead-in area is preferably set as a velocity for the best recording characteristics, i.e., a lower velocity than the highest one; for example, recording at a single or double speed is preferable.

When a user instructs recording at an octuple speed, controller 210 reads out boundary information (physical address) Ab8 related to the octuple speed from the disc boundary information included in the system lead-in information, and compares this boundary information Ab8 with physical address Ac of the present recording position (S101). If physical address Ac of the present recording position is not on the outer circumferential side, i.e. outside, of boundary information Ab8 of the disc (S101: NO), controller 210 compares boundary information (physical address) Ab6 related to a sextuple speed lower than the octuple speed by one rank with physical address Ac of the present recording position (S111).

Here, if physical address Ac of the present recording position is on the outside of boundary information Ab6 of the disc (S111: YES), then controller 210 reads out boundary information (physical address) Ad6 related to the sextuple speed from the drive boundary information representing its recording limitation positions, and compares boundary information Ad6 with physical address Ac of the present recording position (S112). Here, if physical address Ac of the present recording position is not on the outside of boundary information Ad6 of the disc (S112: NO), controller 210 reads out boundary information (physical address) Ad4 related to a quadruple speed lower than the sextuple speed by one rank from the drive boundary information representing its recording limitation positions, and compares boundary information Ad4 with physical address Ac of the present recording position (S122).

If physical address Ac of the present recording position is on the outside of boundary information Ad4 of the disc (S122: YES), then controller 210 sets the recording speed at the quadruple speed (S123), and controls each component to start recording operation at the quadruple speed (S124).

After starting the quadruple-speed recording, controller 210 determines whether a tuple speed instructed by the user is the quadruple speed or not (S125). Here, since the user instructed tuple speed is the octuple speed (S125: NO), controller 210 compares present recording position Ac with two pieces of boundary information Ab6 and Ad6 related to the sextuple speed higher than the presently set quadruple speed by one rank (S111, S112), and monitors whether present recording position Ac reaches the outside of any of the two pieces of boundary information Ab6 and Ad6 during the progressing recording.

Controller 210 performs recording at the quadruple speed (S123, S124) while present recording position Ac remains on the inner circumferential side, i.e. inside, of either one of the two pieces of boundary information Ab6 and Ad6 (S111: YES, S112: NO, S112: YES). Thereafter, if present recording position Ac reaches the outside of any of the two pieces of boundary information Ab6 and Ad6 (S111: YES, S112: YES), then controller 210 sets the recording speed at a sextuple speed (S113), and controls each component to start recording operation at the sextuple speed (S114).

Thereafter, in the similar manner, controller 210 monitors whether present recording position Ac reaches the outside of any of two pieces of boundary information Ab8 and Ad8 related to an octuple speed higher than the sextuple speed by one rank, while the recording is advancing (S115: No to S101, S102). If present recording position Ac reaches the outside of any of the two pieces of boundary information Ab8 and Ad8 (S101: YES, S102: YES), then controller 210 sets the recording speed at the octuple speed higher by one rank (S103), controls each component to start recording operation at the octuple speed, and continues the recording at the octuple speed until the recording operation is terminated (S104).

When a user instructs recording at a quadruple speed, controller 210 reads out boundary information (physical address) Ab4 related to the quadruple speed from the disc boundary information included in the system lead-in information, and compares this boundary information Ab4 with physical address Ac of the present recording position (S121). If physical address Ac of the present recording position is not on the outside of boundary information Ab4 of the disc (S121: NO), controller 210 sets the recording speed at a double speed (S131), controls each component to start recording operation at the double speed (S132).

After starting the double-speed recording, controller 210 determines whether a tuple speed instructed by the user is the double speed or not (S133). Here, since the user instructed tuple speed is the quadruple speed (S133: NO), controller 210 compares present recording position Ac with two pieces of boundary information Ab4 and Ad4 related to the quadruple speed higher than the presently set double speed by one rank (S121, S122), and monitors whether present recording position Ac reaches the outside of any of the two pieces of boundary information Ab4 and Ad4 while the recording is advancing.

Controller 210 performs recording at the double speed (S131, S132) while present recording position Ac remains on the inside of either one of the two pieces of boundary information Ab4 and Ad4 (S121: NO or S122: NO). Thereafter, if present recording position Ac reaches the outside of any of the two pieces of boundary information Ab4 and Ad4 (S121: YES, S122: YES), then controller 210 sets the recording speed at the quadruple speed that is higher by one rank (S123), and controls each component to start recording operation at the quadruple speed (S124).

After starting the quadruple-speed recording, controller 210 determines whether a tuple speed instructed by the user is the quadruple speed or not (S125). Here, since the user instructed tuple speed is the quadruple speed (S125: YES), controller 210 continues the recording at the quadruple speed until the recording operation is terminated (S124).

In the case of the user instructed tuple speed being a sextuple speed, the recording operation is also performed similarly to the aforementioned example for the quadruple speed. In the case of the user instructed tuple speed being a double speed, whole data area 14 is the recording guarantee zone as shown in FIG. 3A, and therefore, the recording is performed with the double speed maintained (S131, S132, S133).

FIGS. 6A to 6D are diagrams schematically showing the flow of recording on unused disc 10 (write once format) at an octuple speed. Here, the drive boundary information (physical address) related to each tuple speed is supposed to be on the inside of the disc than the boundary information.

Figure 6A:
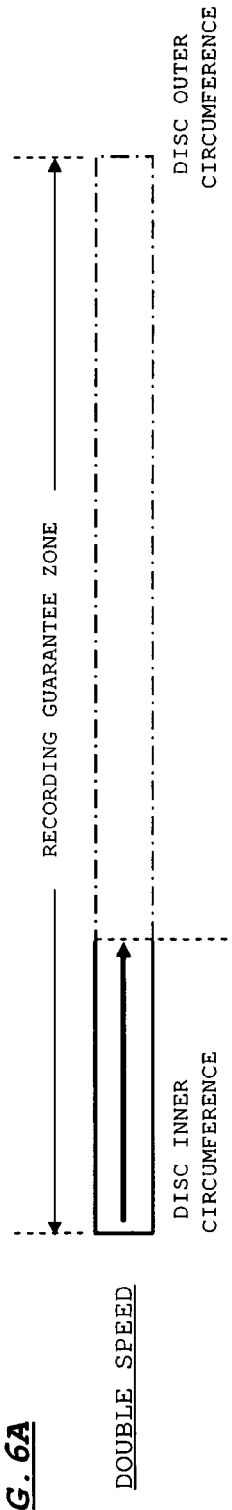
FIGS. 6A to 6D are diagrams schematically showing tuple-speed recording operation according to the preferred embodiment of the present invention.
Figure 6B:
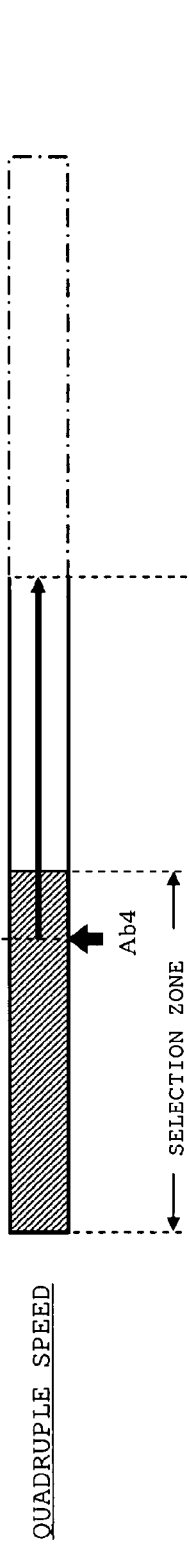
Figure 6C:
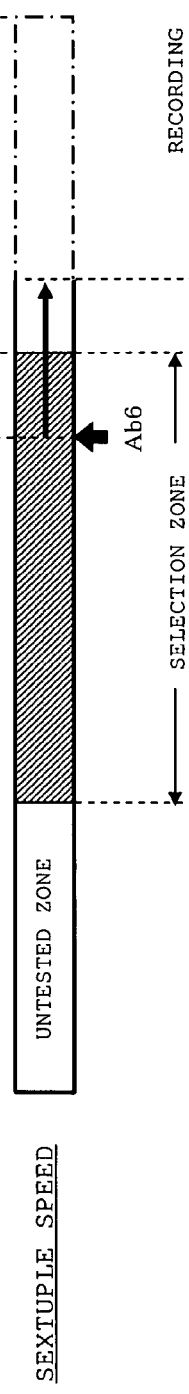
Figure 6D:
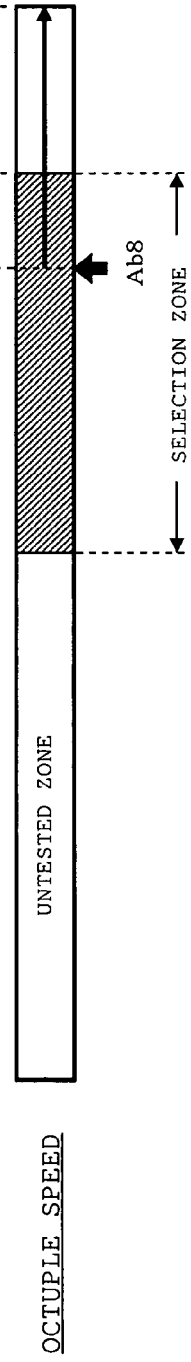

As shown in FIG. 6A, the recording is performed at a double speed on an area from the innermost circumference of the disc to boundary information Ab4 related to a quadruple speed. Thereafter, if the recording position reaches boundary information (physical address) Ab4 related to the quadruple speed, the recording is performed at the quadruple speed on an area from this position to boundary information (physical address) Ab6 related to a sextuple speed as shown in FIG. 6B. Further, if the recording position reaches boundary information (physical address) Ab6 related to the sextuple speed, the recording is performed at the sextuple speed on an area from this position to boundary information (physical address) Ab8 related to an octuple speed as shown in FIG. 6C. After the recording position reaches boundary information (physical address) Ab8 related to the octuple speed, the recording is performed at the octuple speed up to the outermost circumferential position as shown in FIG. 6D.

Now, the boundary positions recorded on the disc will be described in detail. The physical addresses are set from system lead-in area 13 to the outer circumference of the disc in sequence. Since system lead-in area 13 is an area dedicated to reproduction having a train of pits formed thereon, the boundary position is avoided being set within the system lead-in area. In other words, the boundary positions are set on the outside of the system lead-in area.

Further, in a recordable disc, disc management information that successively renews a data recording state and the like successively is recorded on the data lead-in area set on the innermost circumferential side of the data area. Since it is important that the data lead-in information is read out correctly from the disc on which recording is finished or unfinished, it is not desirable to set the boundary position within the data lead-in area. This is because optimum recording should not be prevented due to a linear velocity being abruptly changed in the middle of recording of the data lead-in information. Further, if the boundary position is set in the middle of the test recording area provided in the data lead-in area, laser power will hardly be adjusted in accordance with test recording. Also for this reason, it is not desirable to set the boundary position within the data lead-in area. Thus, the boundary positions are desirable to be set on the outside of the data lead-in area.

In a disc recordable at an octuple or more speed, the boundary position will predictably be close to the outermost circumference of the disc. However, in order to allow the disc to be recorded at the predetermined octuple or more speed, capability of the recording at the predetermined speed should be guaranteed on an area inwardly 1 mm or more distant from the outermost circumferential track, by taking into account improper chucking or decentering of the disc during a test conducted by a disc manufacturer. Further, there is set data lead-out area 15 at the outermost circumference to prevent runaway operation at the termination of reproduction or the like, and there is not recorded user data. In a 12-cm-diameter disc, the outermost circumferential track is formed at a position of 58 mm radius, and therefore, at least an area on the outside of 55 mm radius should be an area where capability of recording at the highest tuple speed is guaranteed in order for a user to really enjoy the utility of a high tuple speed. If recording at the highest tuple speed can be performed from the inside of the 55 mm radius, it will, as a matter of course, improve user-friendliness.

In accordance with the present embodiment as described above, since the boundary information (disc boundary information) of an area on which capability of recording at a predetermined tuple speed is guaranteed is recorded on system lead-in area 13 while being related to each tuple speed, the optical disc device can obtain the boundary information related to each tuple speed by reproduction from system lead-in area 13. Therefore, the optical disc device, when a tuple speed is instructed, can be controlled to perform recording at the tuple speed on the outside of the boundary related to the tuple speed, and at a speed properly lower than the instructed tuple speed on the inside thereof. Further, on the recording guarantee zone, capability of recording at a predetermined tuple speed is guaranteed, and therefore, optimum recording can be realized. Since the recording guarantee zone is provided on the outer circumference, capacity of recording at a tuple speed is increased for recording at a constant linear velocity. This realizes both improvement in user-friendliness and reliability of recorded information by tuple-speed recording. In accordance with the process flow shown in FIG. 5, the recording is performed at as high a tuple speed as possible even when the recording at the instructed tuple speed cannot be performed, and therefore, the recording can be quickened.

Another Preferred Embodiment 1

Figure 7:
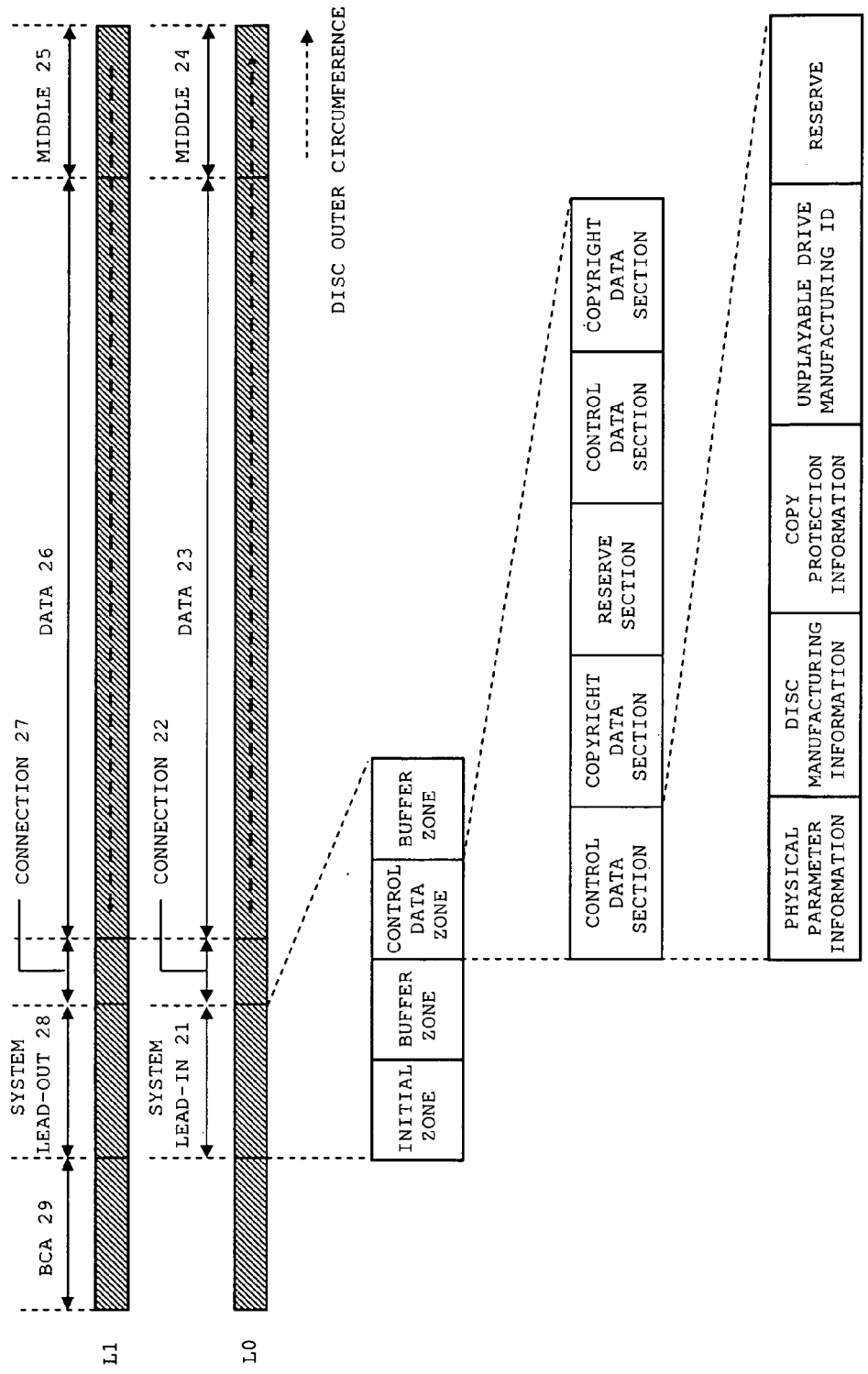
FIG. 7 shows an area format of a disc (two-layer disc) according to another preferred embodiment 1 of the present invention.
Figure 8:
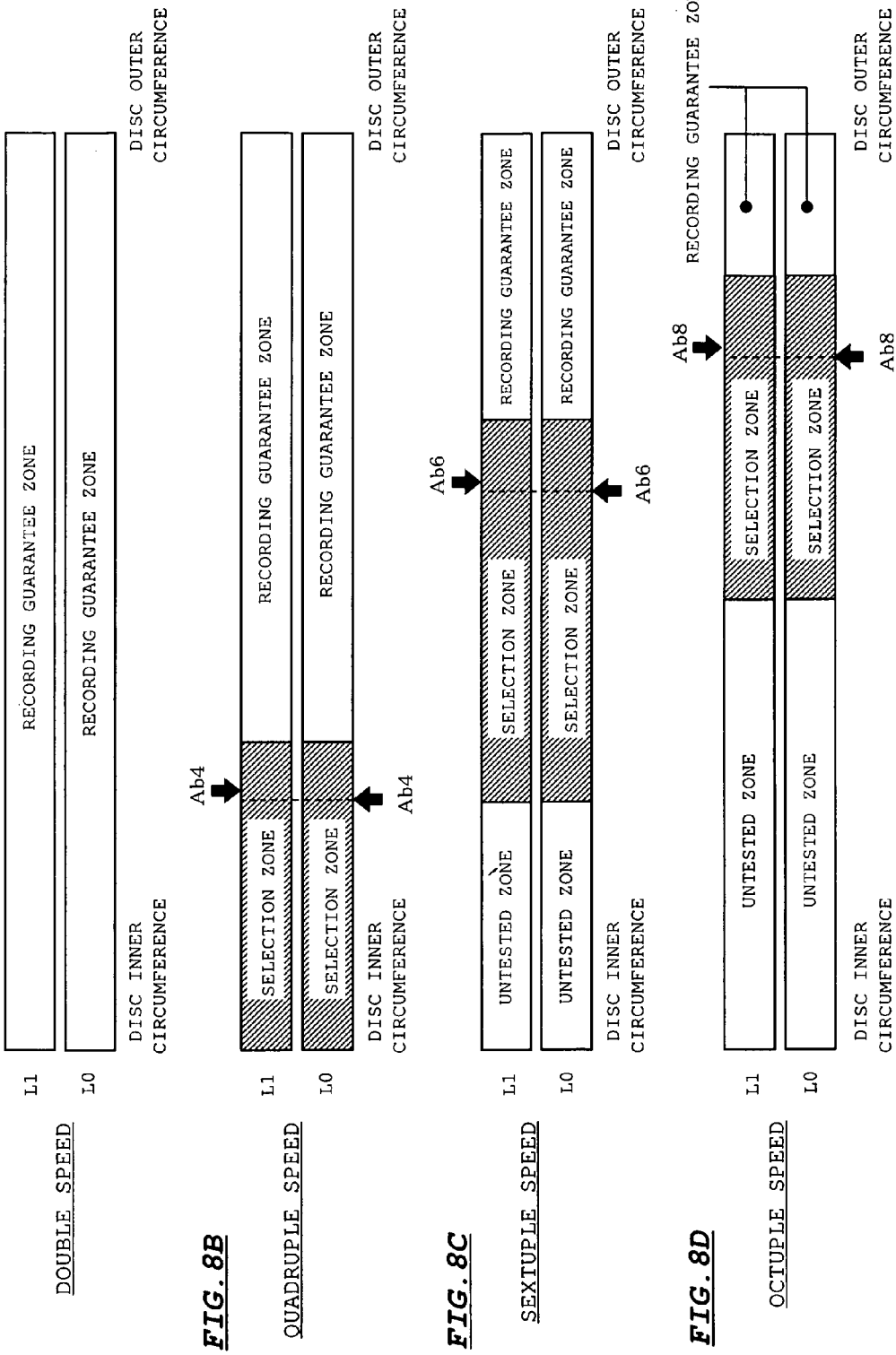
FIGS. 8A to 8D show exemplary setting of disc boundary information according to another preferred embodiment 1 of the present invention.

FIG. 7 is a diagram showing an area format in the case of two recording layers being provided in a thickness direction of disc 10 and a data format in system lead-in area 21. In FIG. 7, symbol L0 denotes a recording layer closer to a laser incidence plane, and symbol L1 denotes a recording layer farther from the plane.

Recording layer L0 is divided into areas which are, starting from the innermost circumference, system lead-in area 21, connection area 22, data area 23, and middle area 24. Recording layer L1 is divided into areas which are, starting from the innermost circumference, burst cutting area (BCA) 29, system lead-out area 28, connection area 27, data area 26, and middle area 25. In order to facilitate reproduction of the BCA, recording area L0 other than recording area L1 is not provided with the BCA.

On system lead-in area 21 and system lead-out area 28, a groove is not formed but only a train of pits are formed. The data format of system lead-in area 21 is similar to the format shown in FIG. 2, and recording parameters for each of recording layers L0 and L1, recording parameters and servo parameters for each corresponding tuple-speed are added to physical parameter information.

The connection areas are flat mirror-finished surfaces on both recording layers L0 and L1. These areas are formed because of difference in physical parameters, such as a track pitch, between the system lead-in area and the data area.

Further, on system lead-in area 21, the track pitch is set large to facilitate readout of initial physical information or the like of the disc.

On data areas 23, 26 and middle areas 24, 25, grooves are formed in a spiral. The grooves are wobbled in the radial direction of the disc similarly to the case of FIG. 2. The wobble holds physical addresses. Data is recorded from the inner to outer circumferences of recording layer L0, and after being recorded up to the outermost circumferential position, the data is recorded from the outer to inner circumferences of recording layer L1.

When the mounted disc is a blank one, the system lead-in information is read out, a data lead-in area is formed in data area 23 of recording layer L0, system lead-in information is copied onto the formed data lead-in area, and the drive test area and the like for recording layer L0 are provided. On recording layer L1, a data lead-out area is formed and a drive test area and the like for recording layer L1 are provided. A recording linear velocity on the data lead-in/lead-out area is preferably set as a velocity for the best recording characteristics, i.e., a lower velocity than the highest one; for example, recording at a single or double speed is preferable.

In the exemplary configuration shown in FIG. 7, the aforementioned disc boundary information is set for each recording layer and is held on system lead-in area 21 as the physical parameter information. Like the aforementioned example, the disc boundary information can be stored in a reserve area of the control data section.

FIGS. 8A to 8D are diagrams showing exemplary setting of the disc boundary information. FIGS. 8A, 8B, 8C, and 8D show examples of setting of the disc boundary information for double, quadruple, sextuple, and octuple recording speeds, respectively.

In the present embodiment as shown in FIGS. 8A to 8D, boundary information (Ab4, Ab6, Ab8) on back-side recording layer L1 are set on the outside of boundary information (Ab4, Ab6, Ab8) on front-side recording layer L0. This is because of the following.

In the case where two recording layers are provided in the thickness direction of the disc like the present embodiment, front-side recording layer L0 will generally be better than back side recording layer L1 in characteristics. Therefore, the reliability of the recorded signals is higher on recording layer L0 than on recording layer L1 when compared at the same radial position. Thus, the boundary that guarantees recording characteristics should be located at an inner position on recording layer L0 compared to the boundary on recording layer L1.

Further, a disc having a plurality of recording layers reduces recording and reproduction characteristics on a whole disc compared to a disc only having a single layer, for example, reduces reflectance at each recording layer and gives rise to interlayer crosstalk. Further, system lead-in area 21 for recording initial physical information of the disc is not located on both of the recording layers, but on recording layer L0. Therefore, recording layer L0, which contains detailed disc parameters, such as information for performing tuple-speed recording and recording conditions, should be as good as possible in recording characteristics. A drive starts its reproduction operation from recording layer L0, and therefore, adjusts various parameters from recording layer L0 in many cases. Thus, it is desirable to set recording layer L0, especially set the boundary positions with recording layer L0 used as a reference recording layer.

For this reason, in the exemplary setting shown in FIGS. 8A to 8D, the boundary information (physical address) of recording layer L1 is shifted outward with respect to the boundary information (physical address) of front-side recording layer L0. Thereby, the reliability of the boundary on recording layer L1 is particularly improved, and therefore, the reliability of the recorded information can be improved.

Here, the shift in the boundary information of recording layer L1 with respect to the boundary information of recording layer L1 is set, for example, considering the estimated decentering of disc 10 and the estimated maximum of the mounting error of the disc with respect to a turntable.

When the decentering is considered as an example, the boundary of recording layer L1 is shifted outward with respect to the boundary of recording layer L0 by the estimated maximum decentering. Since the recording characteristics are the most stable for recording layer L0 as described above, in order to set the boundary on disc 10, the disc manufacturer can adopt a method to obtain the boundary by testing recording layer L0 and to set the boundary on recording layers L0 and L1 at a position shifted to the outside of the obtained boundary by a predetermined margin. In this case, considering the difference in recording characteristics between recording layers L0 and L1, the margin is set at such a large value as to guarantee the recording even on an area of recording layer L1 bounded by the boundary at a corresponding tuple speed.

However, disc 10 usually has a further decentering on a disc-by-disc basis. Therefore, if the aforementioned boundary is applied to a mass-produced disc as it is, the boundary may be improper for the other recording layer that shows inferior characteristics in spite of the aforementioned large margin. In order to prevent this disadvantage, the boundary information (physical address) is set as a position further shifted to the outside of the margined boundary by the maximum decentering for recording layer L1 which shows the inferior characteristics. Thereby, the proper boundary information will be guaranteed for recording layer L1, and reliability of the boundary will be improved in spite of the disc-by-disc based decentering.

Suppose that the maximum decentering of recording layer L0 is roughly 40 μm and the maximum decentering of recording layer L1 is roughly 60 μm by considering a manufacturing error. In this case, by setting the boundary position on recording layer L1 at the outside of the boundary position on recording layer L0 by 100 μm or more, the set position of the boundary can be prevented from being improper due to the decentering even if the aforementioned maximum decentering arises between mass-produced and tested discs. Therefore, if the boundary position is set at a position shifted by roughly 100 μm, discs free from an error in the boundary position can stably be supplied on a massive scale.

Likewise, in the case that a mounting error of the optical disc with respect to a turntable is taken into account, the boundary on recording layer L0 is shifted to the outside of the boundary on recording layer L0 by the maximum estimation of the mounting error. Here, the mounting error means a displacement of the relative position of the disc center with respect to the axis of the turntable from the relative position during the test of the disc. This mounting error arises from the deviation of an engaging state between the center hole of the disc and a hub of the turntable engaging the hole at the time of disc clamping from the engaging state during the test of the disc.

Also in this case, like the former case of decentering, setting the boundary on recording layer L1 by use of recording layer L0 as a standard may cause an improper boundary on recording layer L1 inferior in recording characteristics for a mass-produced disc due to the mounting error. In order to prevent this disadvantage, the boundary information (physical address) is set at a position further shifted to the outside of the margined boundary by the maximum estimation of the mounting error for recording layer L1.

The disc manufacturer can, in a quality test of the recording layer, adopt a method of obtaining the recording characteristics for each of the recording layers L0 and L1, and specifying the boundary position for each recording layer. In this case, even if the boundary position largely varies by recording layer, the boundary position may be set for each recording layer as it is. However, in order to further improve the reliability of the boundaries and facilitate a control process, the boundary positions on recording layers L0 and L1 may be matched with the outermost one of the boundary positions on the recording layers.

Further, the matched boundary position may be shifted outward on the disc, considering the decentering and mounting error of the disc, like the aforementioned case. In addition, the boundary position on recording layer L1 prone to deteriorate in recording characteristics may be set on the outside of the matched boundary position by a certain distance to further ensure the safety of the boundary position.

In the case of setting the boundary position by physical address, the boundary position on recording layer L1 can, as a good way, be shifted with respect to the boundary position on recording layer L0 within a range of 0.5 mm distant from the boundary position on recording layer L0, for the following reason. The starting positions on recording layers L0 and L1 may, in some cases, deviate from each other by roughly 0.5 mm in the radial direction of the disc due to a disc manufacturing error, such as a mounting error of a stamper. Such an error in the starting positions cause a difference in physical address corresponding to 0.5 mm at the maximum between recording layers L0 and L1 even at the same position on the disc plane. Therefore, in the case of setting the boundary position by physical address, it is a good way to shift the boundary position on recording layer L1 to the outside of the boundary position on recording layer L0 within a range of address difference corresponding to 0.5 mm.

Figure 9:
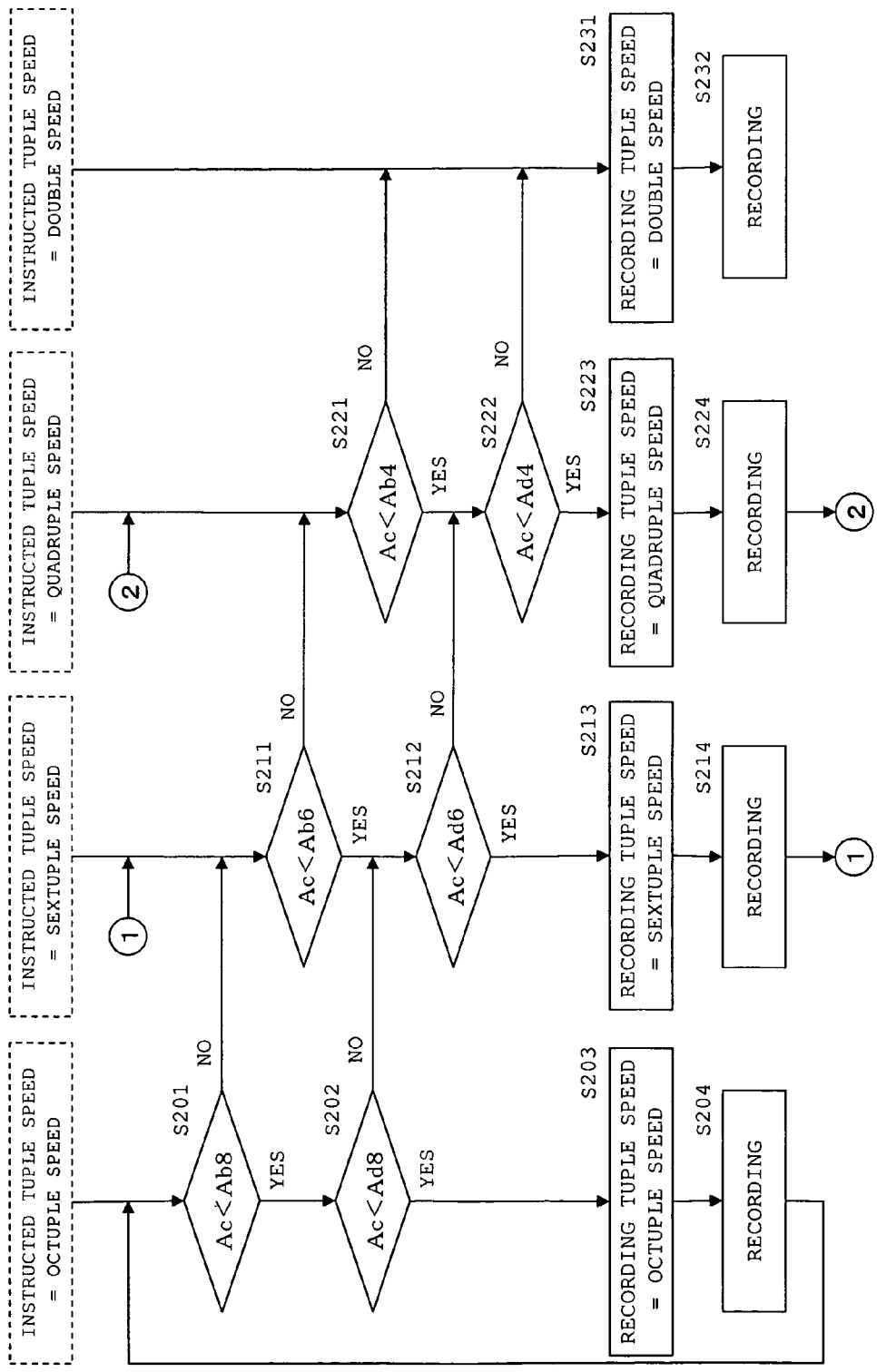
FIG. 9 is a process flow chart in tuple-speed recording according to another preferred embodiment 1 of the present invention.

FIG. 9 is a process flow chart of tuple-speed recording on back-side recording layer L1. The process flow on front-side recording layer L0 is the same as the flow shown in FIG. 5. Disc 10 is supposed to be a disc of a write-once format also in FIG. 9.

Steps S201 to S204, S211 to S214, S221 to S224, and S231 to S232 in FIG. 9 are almost the same as steps S101 to S104, S111 to S114, S121 to S124, and S131 to S132 in FIG. 5, respectively.

However, since physical addresses of back-side recording layer L1 are provided in the reverse order of the physical addresses of front-side recording layer L0, i.e. in an order from the outermost to innermost circumferences, the left-hand and right-hand sides should be interchanged in the comparisons at steps S201, S202, S211, S212, S221, and S222.

Further, since the recording is performed from the outer to inner circumferences unlike the aforementioned example, the present recording position (physical address) may, in some case, reach the inside of the boundary information (physical address) related to each tuple speed during the progressing recording. In this case, the tuple speed is reduced by one rank.

Therefore, in the process flow shown in FIG. 9, monitoring is performed as to whether present recording position (physical address) Ac reaches the inside of the disc boundary information (physical address) Ab8 or drive boundary information (physical address) Ad8 related to an octuple speed (S201, S202) during the recording at the octuple speed (S203, S204). Likewise, monitoring is performed as to whether present recording position (physical address) Ac reaches the inside of the disc boundary information (physical address) Ab6, Ab4 or drive boundary information (physical address) Ad6, Ad4 related to a sextuple or quadruple speed (S211, S212/S221, S222) during the recording at each speed (S213, S214/S223, S224). If present recording position Ac reaches the inside of the boundary information, then the recording speed is changed to a lower tuple speed by one rank (S213, S223, S231), and the recording at the changed tuple speed is performed (S214, S224, S234).

Since the recording can only be performed at a double speed after present recording position Ac reaches the inside of boundary information (physical address) Ab4 or Ad4, the recording is performed (S232) by changing the tuple speed to the double speed (S231).

FIGS. 10A to 10D are diagrams schematically showing the flow of recording from the outermost circumference of back-side recording layer L1 at an octuple speed. Here, the drive boundary information (physical address) related to each tuple speed is supposed to be on the inside of the disc boundary information.

As shown in FIG. 10D, the recording is performed at an octuple speed on an area from the outer circumference of the disc to boundary information Ab8 related to an octuple speed. Thereafter, if the recording position reaches boundary information (physical address) Ab8 related to the optuple speed, the recording is performed at a sextuple speed on an area from this position to boundary information (physical address) Ab6 related to the sextuple speed as shown in FIG. 10C. Further, if the recording position reaches boundary information (physical address) Ab6 related to a sextuple speed, the recording is performed at a quadruple speed on an area from this position to boundary information (physical address) Ab4 related to the quadruple speed as shown in FIG. 10B. After the recording position reaches boundary information (physical address) Ab4 related to the quadruple speed, the recording is performed at a double speed up to the innermost circumferential position as shown in FIG. 10A.

Now, the boundary positions recorded on the disc will be described in detail. The physical addresses on recording layer L0 are set from the system lead-in area to the end of a middle area in the sequence of inner to outer circumferences. The physical addresses are set from the middle area to the data lead-out area and the system lead-out area on recording layer L1 in the sequence of outer to inner circumferences.

Since the system lead-in and system lead-out areas are areas dedicated to reproduction having a train of pits formed thereon, the boundary position is avoided being set within the system lead-in area or the system lead-out area. In other words, the boundary positions are set on the outside of the system lead-in and system lead-out areas.

Further, in a recordable disc, disc management information that successively renews a data recording state and the like is recorded on the data lead-in area. Since it is important that the data lead-in information is read out correctly from the disc on which recording is finished, it is not desirable to set the boundary position within the data lead-in area set on the innermost circumference of the data area. This is because optimum recording should not be prevented due to a linear velocity being abruptly changed in the middle of recording of the data lead-in information. Further, if the boundary position is set in the middle of the test recording area provided in the data lead-in area and the data lead-out area, laser power will hardly be adjusted in accordance with test recording. Thus, the boundary positions are desirable to be set on the outside of the data lead-in area and the data lead-out area.

In a disc recordable at an octuple or more speed, the boundary position will predictably be close to the outermost circumference of the disc. However, in order to allow the disc to be recorded at the predetermined octuple or more speed, capability of the recording at the predetermined speed should be guaranteed on an area inwardly 1 mm or more distant from the outermost circumferential track for both recording layers L0 and L1, by taking into account improper chucking or decentering of the disc during a test conducted by a disc manufacturer. Further, there is set the middle area at the outermost circumference to prevent runaway operation at the end of process for the layer or the like, and there is not recorded user data. The outermost circumferential track is formed at a position of 58 mm radius, and therefore, at least an area on the outside of 55 mm radius should be an area where capability of recording at the highest tuple speed is guaranteed in order to allow a user to really enjoy the utility of a high tuple speed. If recording at the highest tuple speed can be performed from the inside of the 55 mm radius, it will, as a matter of course, improve user-friendliness.

Another Preferred Embodiment 2

Figure 11:
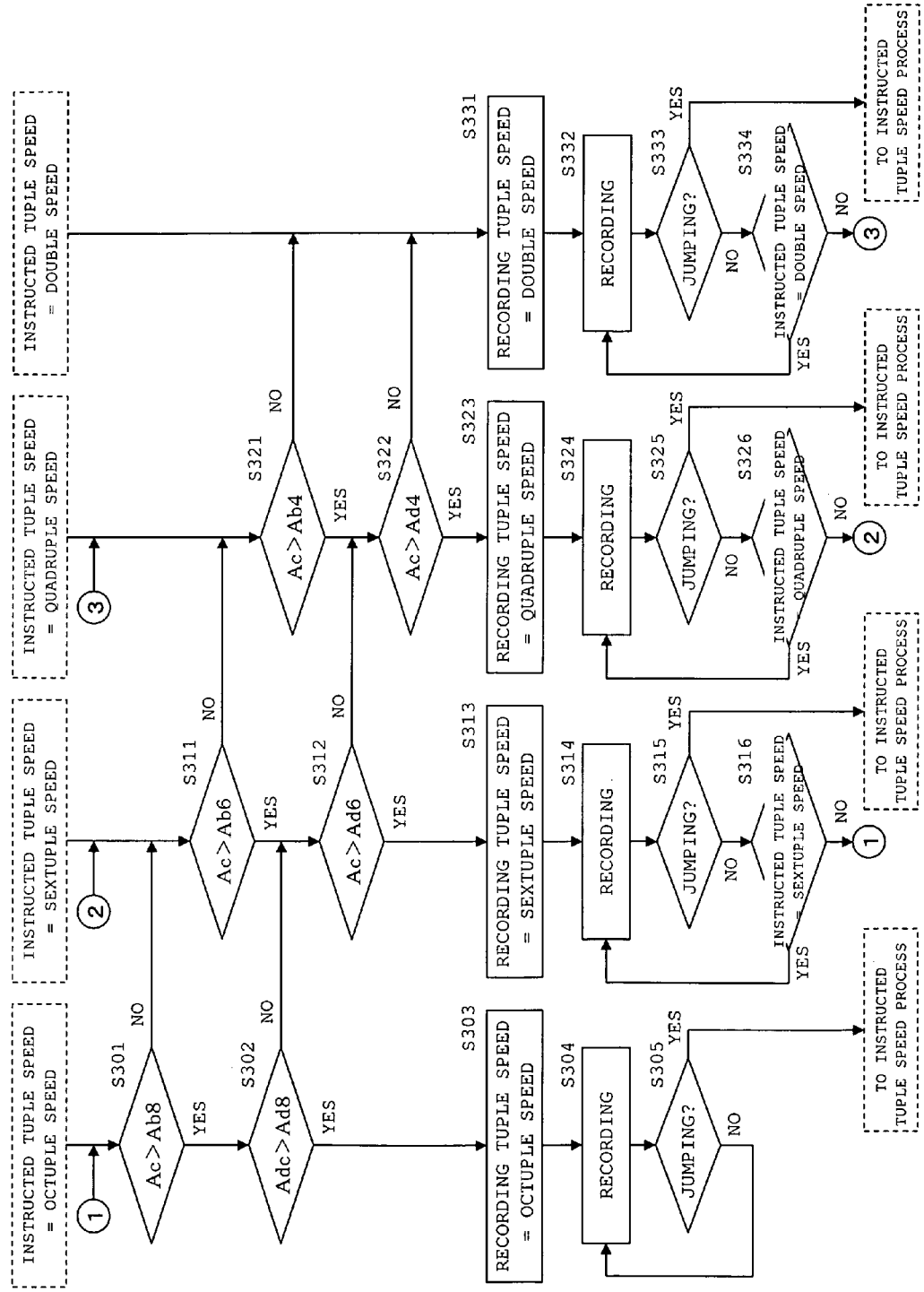
FIG. 11 is a process flow chart in tuple-speed recording according to another preferred embodiment 2 of the present invention.
Figure 12:
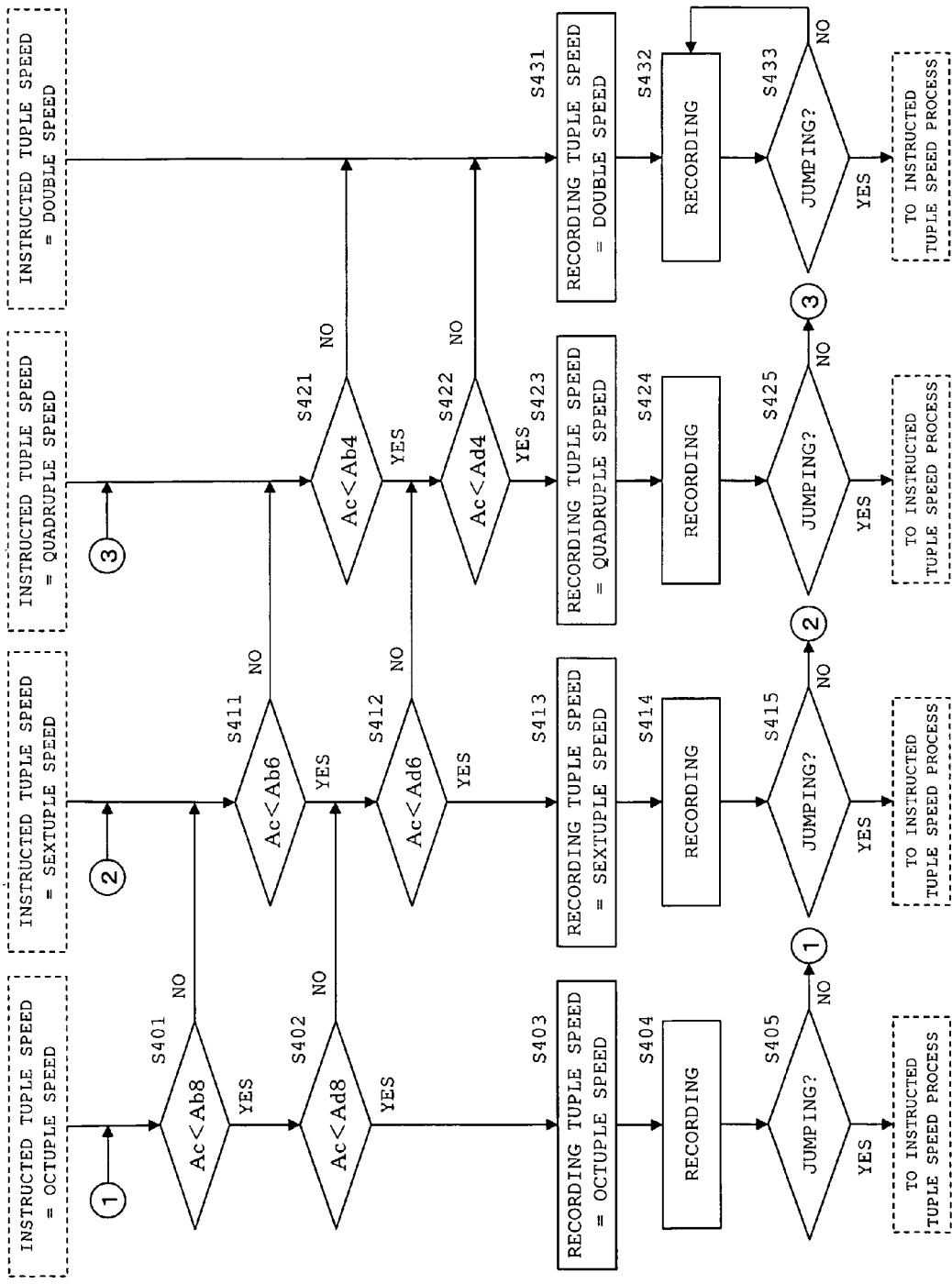
FIG. 12 is a diagram showing process flow in tuple-speed recording according to another preferred embodiment 2 of the present invention.

FIG. 9, which showed process flow for write-once disc 10, is modified as FIGS. 11 and 12 for process flow of tuple-speed recording for a rewritable disc having two recording layers, for example. In this process, the recording position can jump between distant positions on the same recording layer and also between different recording layers.

FIG. 11 shows a process flow in the case of the present recording position being on front-side recording layer L0, and FIG. 12 on back-side recording layer L1. The recording is performed from the inner to outer circumferences on recording layer L0, and from the outer to inner circumferences on recording layer L1. Area and data formats are similar to the formats shown in FIG. 7.

Even in rewritable disc 10, the recording is performed continuously from the inner to outer circumferences of recording layer L0 and from the outer to inner circumferences of recording layer L1 like in the recordable disc until a jump occurs. Therefore, a process like that shown in FIG. 5 can be performed for recording layer L0, and FIG. 9 for recording layer L1 until the jump occurs.

Therefore, process steps S301 to S304, S311 to S314 and S316, S321 to S324 and S326, and S331 to S332 and S334 in FIG. 11 are the same as process steps S101 to S104, S111 to S114 and S115, S121 to S124 and S125, and S131 to S132 and S133 in FIG. 5, respectively.

Likewise, process steps S401 to S404, S411 to S414, S421 to S424, and S431 to S432 in FIG. 12 are the same as process steps S201 to S204, S211 to S214, S221 to S224, and S231 to S232 in FIG. 9, respectively.

However, in the case of rewritable disc 10, the recording position jumps occasionally between distant positions on the same recording layer and between different recording layers in the middle of the recording operation as described above. The jump changes the present recording position to another one discontinuously. Therefore, after the jump, a judgment on allowability of the recording at an instructed speed and a process based on the judgment preferably are performed again. For this reason, once the jump occurs in the process flow shown in FIGS. 11 and 12 (S305 to S333: YES/S405 to S433: YES), the process returns to the top of the process flow for an instructed tuple speed.

For example, if a user instructs a sextuple speed and a jump occurs on recording layer L0 while a process of step S314 of FIG. 11 is now being performed for the same recording layer L0, then a process after the jump is started from the top of the process flow for the recording on recording layer L0 at the instructed sextuple speed, i.e. step S311 of FIG. 11. Further, if a user instructs an octuple speed and a jump occurs to another recording layer L1 while a process of step S324 of FIG. 11 is now being performed for recording layer L0, then a process after the jump is started from the top of the process flow for the recording on recording layer L1 at the instructed octuple speed, i.e. step S401 of FIG. 12.

Although a tuple-speed recording process for rewritable disc 10 having two recording layers was described, a tuple-speed recording process for rewritable disc 10 only having a single recording layer follows the process flow shown in FIG. 11.

Thus, disc 10 of a rewritable format as well as a write-once format, when a tuple speed is instructed, can be controlled to perform recording at the instructed tuple speed on the outside of the boundary related to the tuple speed, and at a speed properly lower than the instructed one on the inside thereof. This realizes both improvement in user-friendliness and reliability of recorded information by tuple-speed recording. Since the recording is performed at as high a tuple speed as possible even when the recording at the instructed tuple speed cannot be performed, the recording can be quickened.

While the preferred embodiments of the present invention have been shown in detail, the present invention is not restricted thereto, but various modifications can also be devised for the embodiments themselves of the present invention.

For example, although system lead-in area 13 only holds the disc boundary information in the aforementioned preferred embodiment, system lead-in area 13 may hold information for identifying the range of the selection zone shown in FIGS. 3A to 3D and FIGS. 8A to 8D as well as the disc boundary information. In one example thereof, physical addresses of starting and ending positions of the selection zone are recorded. An optical disc device can thereby determine whether the boundary position that a disc manufacturer specified by the disc boundary information is within the selection zone. In this case, if the boundary position is set on the outside of the selection zone for example, the device can avoid tuple-speed recording or recording itself, by regarding the optical disc as one doubtful in reliability.

Figure 13:
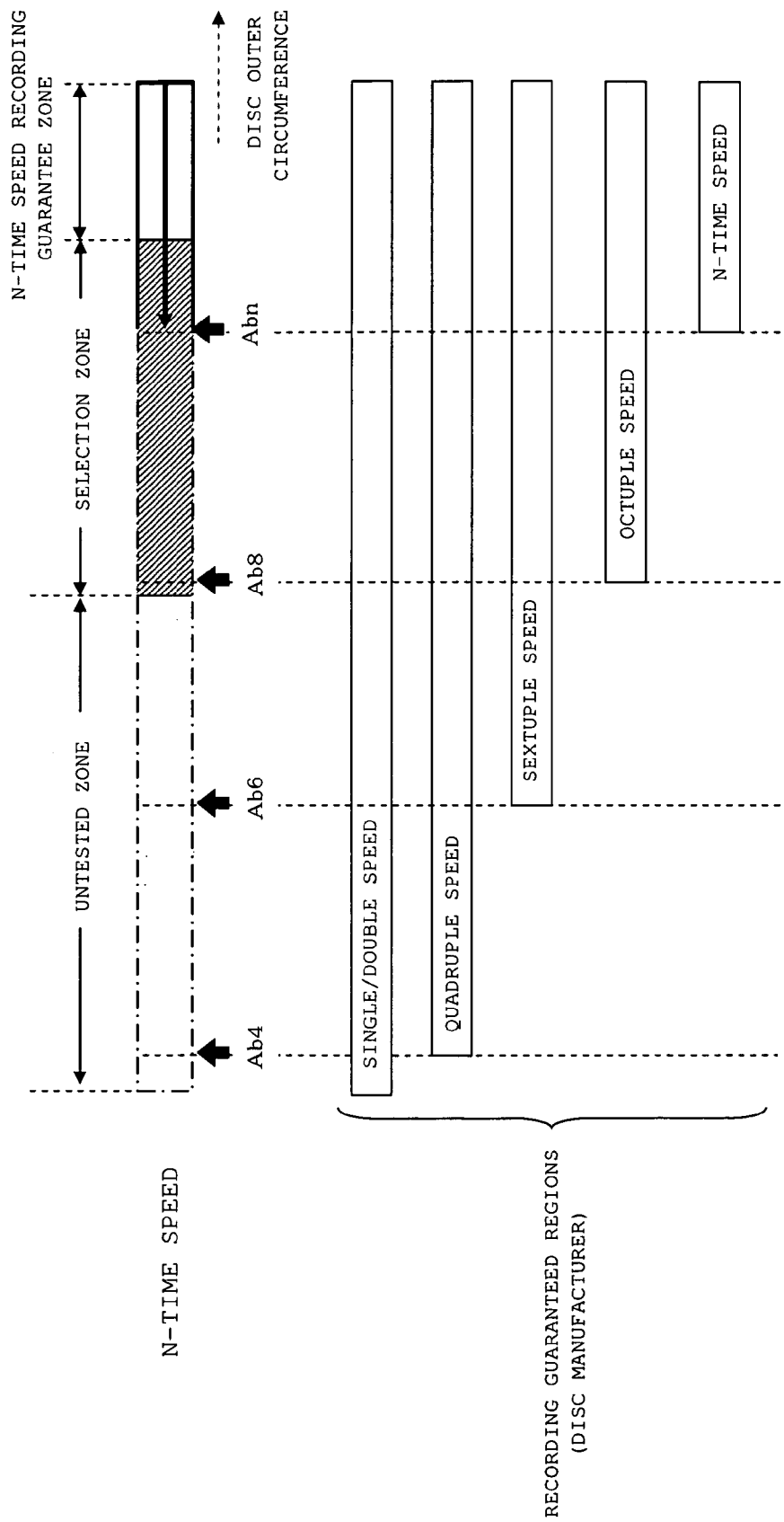
FIG. 13 shows exemplary setting of disc boundary information according to still another preferred embodiment (n-time speed recording) of the present invention.

Further, although the boundary position information only related to an octuple or lower speed is shown as a specific example, the optical disc can also support higher-speed recording, and more boundary positions can be set with the increased tuple speed. A disc which supports an n-time speed and has a plurality of boundary positions set thereon is shown in FIG. 13. A recording guarantee zone for the n-time speed, and selection and untested zones are provided in this example. A portion on the outside of selection zone Abn, for which recording has been tested by a disc manufacturer, shows sufficient recording characteristics even at the n-time speed. However, for a portion on the inside of selection zone Abn, on which recording is performed at a lower speed than the n-time speed, the disc manufacturer conducts a test as to at which tuple speed the recording is allowed, and sets the boundary positions proved at the respective speeds as plural positions Ab4, Ab6, and Ab8.

Areas on the inside of the boundary position Abn recordable at respective tuple speeds can thereby be revealed, and the drive can, like in the aforementioned example, control a linear velocity stepwise in response to the boundary positions when performing the recording at a tuple speed selected by a user. This example allows an n-time-speed medium to be used as a medium for a lower speed than the n-time speed and used with a drive supporting a low speed only. This exemplary technique can also be applied to an optical disc having a plurality of recording layers. In this case, flows for n-time speeds are added to each of FIGS. 9, 11, and 12.

Although the boundary positions and position information of each zone are recorded as physical addresses in the preferred embodiments, they can, without restriction thereto, be some other position information for the disc, such as information of radial positions, and inner, middle and outer circumferences. In this case, a mounting error and a decentering are preferably taken into account to provide the position information. Information of a tuple speed can also be any other information related to a rotational speed of the disc, such as a linear velocity as well as a tuplicity number.

Although the disc having two recording layers allows both a boundary position and a tuple speed to be set for each recording layer in the aforementioned embodiments, an optical disc having a plurality of recording layers may, without restriction thereto, allow information of recording layer L0 to be recorded beforehand and allow a drive to provide boundary information of another layer based on the information of recording layer L0.

Further, although the present invention is applied to a recordable HD as an example in the preferred embodiments, the present invention can also be applied to other discs, such as a Blu-ray disc and drive devices therefor. A Blu-ray disc is different from those exemplarily described above in that the system lead-in area holds physical information by high-frequency wobble without a pit structure, whereas the present invention can also be applied to the Blu-ray disc by modifying the conditions described in the present application to the structure of the Blu-ray disc.

Although a disc having single or two recording layers and a drive device therefor are illustrated in the preferred embodiments, the present invention can also be applied to a disc having three or more recording layers and a drive device therefore. The area division to the selection zone and the recording guarantee zone is merely an example, and other area divisions are also allowed if desired.

Although a recording speed (tuple speed) is set with reference to drive boundary information as well as disc boundary information in the preferred embodiments, the recording speed (tuple-speed) can also be set only with reference to disc boundary information if the optical disc device has such high performance as to perform recording on the inside of a boundary defined by the disc boundary information. In this case, steps S102, S112, and S122 can be removed from the process flow shown in FIG. 5, and corresponding steps from the process flow in FIGS. 9, 11, and 12.

Although the recording guarantee, selection, and untested zones are set on data area 14 in the preferred embodiments, data area 14 can also be divided based on the boundary information without these zones set. In this case, the recording can be performed on the outside of the boundary position based on the boundary information at a related tuple speed, and can avoid the recording on the inside of the boundary position at the related tuple speed.

In addition, although the information for specifying the selection zone is allowed to be included in the system lead-in information in the preferred embodiments, the information for specifying the recording guarantee zone and the untested zone can also be included in the system lead-in information or the BCA information. In this configuration, the drive can specify the zones, and for example, can perform such a process as recording at a tuple speed only related to the recording guarantee zone.

Although the recording speed is determined based on the boundary information recorded on the system lead-in in the preferred embodiments, the recording speed can, instead, properly be changed depending on the servo characteristics in the selection zone.

Residual error in radial tracking, which represents servo characteristics, generally arises from the form of the groove on the disc. The residual error is inclined to increase with an increase in the rotational speed during a high tuple-speed recording. The radial tracking residual error can be obtained from the radial push-pull signal.

The residual error in the radial tracking on the recording guarantee zone is such a value to allow the drive to properly operate (e.g., ±0.014 µm or less). The radial tracking residual error likewise based on the servo characteristics on the selection zone is a larger value than the residual error on the recording guarantee zone (e.g. ±0.020 µm or less). The value can allow the drive to properly operate if specific conditions, such as low variation in a margin in a recording film and mechanical characteristics including tilt, are fulfilled. The residual error on the untested zone is obviously larger than on the selection zone, and is preferably reduced to allow the drive to properly operate.

In this example, the drive device, at the start of recording at an instructed tuple speed, determines whether the selection zone has been set for the tuple speed. If the selection zone has been set, the device tests the servo characteristics on the selection zone at the tuple speed prior to the recording operation, and finalizes the boundary position of an area that guarantees the servo characteristics within the selection zone. The device performs the recording at the instructed speed if the recording position is on the outside of the boundary position, and at a lower speed than the instructed tuple speed if the recording position is on the inside of the boundary position.

In this case, the boundary position can also be finalized beforehand when the disc is mounted, and the information related to the finalized boundary position may be stored in a memory to be read out afterward during the recording operation. The range of the selection zone can be specified by reading out the information on the system lead-in area, whereas the range of the selection zone for a specific tuple speed can also be stored in a memory or the like in the drive beforehand. The servo characteristics can be tested with reference to the aforementioned residual error in the radial tracking, whereas the servo characteristics can also be determined based on other parameters (such as acceleration characteristics and a decentering).

In addition, the embodiments of the present invention can variously modified as desired within the scope of the claimed technical idea.

What is claimed is:
1. A recordable optical disc, comprising:
    a read-only system area; and
    a recordable data area, wherein
    boundary information representing a boundary in a radial direction of an area on which capability of recording at a predetermined recording speed is based on a test, performed by a disc manufacturer, for a recording characteristic with respect to the optical disc is recorded on the system area,
    the data area is divided in the radial direction into a recording guarantee zone that requires capability of recording thereon at the predetermined recording speed, and a selection zone for a disc manufacturer to determine thereon a radial position up to which capability of recording at the predetermined recording speed is guaranteed by a disc manufacturer based on a test for a recording characteristic with respect to the optical disc, information for specifying the recording guarantee zone and the selection zone is included in the optical disc, and the boundary is set within the selection zone.

2. The optical disc according to claim 1, wherein the disc includes a plurality of recording layers provided in a thickness direction thereof, and the boundary information is recorded on the system area for each of the plurality of recording layers.

3. The optical disc according to claim 2, wherein
with respect to the boundary set for one recording layer of the plurality of recording layers closest to a light irradiation side, the boundary set for another recording layer of the plurality of recording layers is shifted outward on the disc.

4. The optical disc according to claim 1, wherein
the boundary information is address information of a recording track formed on the data area.

5. An optical disc device for recording information on a recordable optical disc, comprising:
an optical pickup that irradiates the optical disc with laser light;
a disc drive unit that rotationally drives the disc;
a servo unit that controls the optical pickup and the disc drive unit;
an information recording unit that records information on the disc through the optical pickup at a predetermined speed and is capable of changing a recording speed of the information if desired; and
an information reproduction unit that reproduces information from the disc through the optical pickup, wherein
the optical disc includes:
a read-only system area; and
a recordable data area, and
disc boundary information representing a boundary in a radial direction of an area on which capability of recording at a predetermined recording speed is based on a test, performed by a disc manufacturer, for a recording characteristic with respect to the optical disc, is recorded on the system area while being related to speed information on the recording speed, and
the information recording unit, upon an instruction of recording at a first recording speed, compares the boundary related to the first recording speed with a present recording position, performs recording at the first recording speed if the present recording position is outside of the boundary, and performs recording at a second recording speed lower than the first recording speed if the present recording position is inside of the boundary, wherein the information recording unit further holds drive boundary information that represents a boundary in a radial direction of an area set as being capable of being recorded on at a predetermined recording speed, while relating the drive boundary information to the speed information on the recording speed, and, upon an instruction of recording at the first recording speed, performs recording at a third recording speed lower than the first recording speed, if the present recording position is on an inside of the boundary of the first recording speed based on the drive boundary information even if the present recording position is not on an inside of the boundary of the first recording speed based on the disc boundary information.

* * * * *